US010676565B2

(12) United States Patent
Zhou et al.

(10) Patent No.: US 10,676,565 B2
(45) Date of Patent: Jun. 9, 2020

(54) ALIPHATIC POLYESTER COATING COMPOSITIONS CONTAINING TETRAMETHYL CYCLOBUTANEDIOL

(71) Applicant: Eastman Chemical Company, Kingsport, TN (US)

(72) Inventors: Jianhui Zhou, Kingsport, TN (US); Stacey James Marsh, Church Hill, TN (US)

(73) Assignee: Eastman Chemical Company, Kingsport, TN (US)

( * ) Notice: Subject to any disclaimer, the term of this patent is extended or adjusted under 35 U.S.C. 154(b) by 232 days.

(21) Appl. No.: 15/846,388

(22) Filed: Dec. 19, 2017

(65) Prior Publication Data

US 2018/0105640 A1   Apr. 19, 2018

Related U.S. Application Data

(62) Division of application No. 14/716,027, filed on May 19, 2015, now abandoned.

(51) Int. Cl.
| | |
|---|---|
| *C08G 63/199* | (2006.01) |
| *C09D 167/02* | (2006.01) |
| *C09D 167/06* | (2006.01) |
| *C09D 7/20* | (2018.01) |
| *C08L 67/02* | (2006.01) |
| *C08G 63/16* | (2006.01) |
| *C08G 63/12* | (2006.01) |
| *C08G 63/20* | (2006.01) |
| *C09D 167/00* | (2006.01) |
| *C08G 63/137* | (2006.01) |

(52) U.S. Cl.
CPC ............ *C08G 63/16* (2013.01); *C08G 63/12* (2013.01); *C08G 63/199* (2013.01); *C08G 63/20* (2013.01); *C09D 167/00* (2013.01); *C09D 167/02* (2013.01); *C09D 167/06* (2013.01); *C08G 63/137* (2013.01); *C08G 2150/00* (2013.01); *C08G 2150/90* (2013.01); *C08L 67/02* (2013.01); *C08L 2201/56* (2013.01); *C08L 2312/00* (2013.01); *C09D 7/20* (2018.01)

(58) Field of Classification Search
None
See application file for complete search history.

(56) References Cited

U.S. PATENT DOCUMENTS

| | | |
|---|---|---|
| 2,891,930 A | 6/1959 | Caldwell et al. |
| 3,018,272 A | 1/1962 | Griffing et al. |
| 3,033,822 A | 5/1962 | Kibler et al. |
| 3,075,952 A | 1/1963 | Coover, Jr. et al. |
| 3,108,083 A | 10/1963 | Laganis |
| 3,216,884 A | 11/1965 | O'Donnell |
| 3,227,764 A | 1/1966 | Martin et al. |
| 3,312,645 A | 4/1967 | George et al. |
| 3,313,777 A | 4/1967 | Elam et al. |
| 3,345,313 A | 10/1967 | Ruhf et al. |
| 3,484,339 A | 12/1969 | Caldwell |
| 3,502,620 A | 3/1970 | Caldwell |
| 3,528,947 A | 9/1970 | Lappin et al. |
| 3,538,187 A | 11/1970 | Feltzen |
| 3,734,874 A | 5/1973 | Kibler et al. |
| 3,772,227 A | 11/1973 | Kapalko et al. |
| 3,779,993 A | 12/1973 | Kibler et al. |
| 3,789,044 A | 1/1974 | Taft et al. |
| 3,800,004 A | 3/1974 | Sherwood et al. |
| 3,856,830 A | 12/1974 | Kuehn |
| 4,054,681 A | 10/1977 | Brüning et al. |
| 4,074,061 A | 2/1978 | Musser |
| 4,076,766 A | 2/1978 | Simms |
| 4,119,680 A | 10/1978 | Vachon |
| 4,120,847 A | 10/1978 | Culbertson |
| 4,196,109 A | 4/1980 | Laganis et al. |
| 4,264,671 A | 4/1981 | Gillern et al. |
| 4,267,279 A | 5/1981 | Howell |
| 4,299,933 A | 11/1981 | McConnell et al. |
| 4,304,901 A | 12/1981 | O'Neill et al. |
| 4,322,508 A | 3/1982 | Peng et al. |
| 4,338,379 A | 7/1982 | Strolle et al. |
| 4,350,807 A | 9/1982 | McConnell et al. |
| 4,363,908 A | 12/1982 | Joyner et al. |
| 4,397,989 A | 8/1983 | Adesko |
| 4,433,119 A | 2/1984 | Brode et al. |
| 4,476,261 A | 10/1984 | Patzschke et al. |
| 4,480,077 A | 10/1984 | Hefner, Jr. |
| 4,525,504 A | 6/1985 | Morris et al. |
| 4,525,544 A | 6/1985 | Nelson et al. |
| 4,581,093 A | 4/1986 | Noyes et al. |
| 4,585,854 A | 4/1986 | Tung et al. |
| 4,698,391 A | 10/1987 | Yacobucci et al. |
| 4,716,200 A | 12/1987 | Berghoff |
| 4,724,173 A | 2/1988 | Rockett et al. |
| 4,737,551 A | 4/1988 | Dervan et al. |
| 4,751,267 A | 6/1988 | Berghoff |
| 4,771,101 A | 9/1988 | Pruett et al. |

(Continued)

FOREIGN PATENT DOCUMENTS

| | | |
|---|---|---|
| BE | 615850 | 7/1962 |
| CA | 740050 A | 8/1966 |

(Continued)

OTHER PUBLICATIONS

"Suitable, adj. and adv." OED Online, Oxford University Press, Sep. 2019, Retrieved from oed.com on Sep. 26, 2019. (Year: 2019).*

(Continued)

*Primary Examiner* — Richard A Huhn
(74) *Attorney, Agent, or Firm* — Matthew W. Smith

(57) ABSTRACT

Disclosed are aliphatic polyester resins containing specific molar quantities of 2,2,4,4-tetramethyl-1,3-cyclobutanediol, and solvent borne, thermosetting monocoating compositions prepared therefrom. The aliphatic polyesters exhibit good hardness and flexibility when formulated into thermosetting coatings compositions.

21 Claims, No Drawings

(56) References Cited

U.S. PATENT DOCUMENTS

| | | | |
|---|---|---|---|
| 4,859,760 | A | 8/1989 | Light, Jr. et al. |
| 4,910,292 | A | 3/1990 | Blount |
| 4,939,233 | A | 7/1990 | Jenkins et al. |
| 4,959,259 | A | 9/1990 | Guilbaud |
| 5,017,679 | A | 5/1991 | Chang et al. |
| 5,023,367 | A | 6/1991 | Calbo, Jr. et al. |
| 5,025,086 | A | 6/1991 | Blount, Jr. et al. |
| 5,097,006 | A | 3/1992 | Kapilow et al. |
| 5,124,388 | A | 6/1992 | Pruett et al. |
| 5,160,792 | A | 11/1992 | Barbee et al. |
| 5,218,042 | A | 6/1993 | Kuo et al. |
| 5,245,002 | A | 9/1993 | Kuo |
| 5,254,637 | A | 10/1993 | Witzeman et al. |
| 5,256,759 | A | 10/1993 | Kuo |
| 5,256,761 | A | 10/1993 | Blount, Jr. |
| 5,288,820 | A | 2/1994 | Rector, Jr. et al. |
| 5,290,631 | A | 3/1994 | Fleury et al. |
| 5,306,567 | A | 4/1994 | Kuo et al. |
| 5,321,118 | A | 6/1994 | Hubbs et al. |
| 5,326,820 | A | 7/1994 | Hoffmann et al. |
| 5,344,872 | A | 9/1994 | Debord et al. |
| 5,349,026 | A | 9/1994 | Emmons et al. |
| 5,369,210 | A | 11/1994 | George et al. |
| 5,371,148 | A | 12/1994 | Taylor et al. |
| 5,393,609 | A | 2/1995 | Chang et al. |
| 5,393,840 | A | 2/1995 | Kuo |
| 5,393,849 | A | 2/1995 | Srinivasan et al. |
| 5,397,641 | A | 3/1995 | Moens et al. |
| 5,416,187 | A | 5/1995 | Kuo et al. |
| 5,439,988 | A | 8/1995 | Moens et al. |
| 5,453,464 | A | 9/1995 | Witzeman et al. |
| 5,464,909 | A | 11/1995 | Chang et al. |
| 5,498,668 | A | 3/1996 | Scott |
| 5,541,268 | A | 7/1996 | Fenn et al. |
| 5,554,701 | A | 9/1996 | Chang et al. |
| 5,596,037 | A | 1/1997 | Moens et al. |
| 5,596,049 | A | 1/1997 | Gallucci et al. |
| 5,646,237 | A | 7/1997 | George et al. |
| 5,654,347 | A | 8/1997 | Khemani et al. |
| 5,663,266 | A | 9/1997 | Taylor et al. |
| 5,696,176 | A | 12/1997 | Khemani et al. |
| 5,852,120 | A | 12/1998 | Bederke |
| 5,919,873 | A | 7/1999 | Irving |
| 5,932,641 | A | 8/1999 | Blanchard et al. |
| 5,955,565 | A | 9/1999 | Morris et al. |
| 5,993,975 | A | 11/1999 | Tanaka et al. |
| 6,087,464 | A | 7/2000 | Swarup et al. |
| 6,120,851 | A | 9/2000 | Borgholte et al. |
| 6,184,311 | B1 | 2/2001 | O'Keeffe et al. |
| 6,211,309 | B1 | 4/2001 | McIntosh et al. |
| 6,248,843 | B1 | 6/2001 | Panandiker et al. |
| 6,255,366 | B1 | 7/2001 | Adams et al. |
| 6,265,072 | B1 | 7/2001 | Fagerburg |
| 6,346,582 | B1 | 2/2002 | Kooijmans et al. |
| 6,423,816 | B1 | 7/2002 | Wamprecht et al. |
| 6,444,781 | B1 | 9/2002 | Kuo et al. |
| 6,780,523 | B2 | 8/2004 | Kuo et al. |
| 6,841,604 | B2 | 1/2005 | Bayer et al. |
| 6,887,937 | B1 | 5/2005 | Vandevoorde et al. |
| 6,992,133 | B2 | 1/2006 | Yokoyama et al. |
| 6,995,194 | B2 | 2/2006 | Moens et al. |
| 7,087,672 | B2 | 8/2006 | Yuan et al. |
| 7,141,625 | B2 | 11/2006 | Komazaki et al. |
| 8,163,850 | B2 | 4/2012 | Marsh et al. |
| 8,168,721 | B2 | 5/2012 | Marsh et al. |
| 8,324,316 | B2 | 12/2012 | Powell et al. |
| 8,449,960 | B2 | 5/2013 | Skillman et al. |
| 8,492,465 | B2 | 7/2013 | Seibold et al. |
| 8,519,055 | B2 | 8/2013 | Marsh et al. |
| 8,524,834 | B2 | 9/2013 | Marsh et al. |
| 8,580,872 | B2 | 11/2013 | Kuo et al. |
| 8,663,765 | B2 | 3/2014 | Skillman et al. |
| 9,029,460 | B2 * | 5/2015 | Marsh ................ C09D 133/062 |
| | | | 524/356 |
| 9,029,461 | B2 * | 5/2015 | Marsh ................ C08G 18/4238 |
| | | | 524/502 |
| 9,034,964 | B2 | 5/2015 | Kuo et al. |
| 9,090,741 | B2 | 7/2015 | Morschhaeuser et al. |
| 9,096,772 | B2 | 8/2015 | Lespinasse et al. |
| 9,200,177 | B2 | 12/2015 | Young et al. |
| 9,487,619 | B2 | 11/2016 | Kuo et al. |
| 9,598,602 | B2 | 3/2017 | Kuo et al. |
| 9,650,539 | B2 | 5/2017 | Kuo et al. |
| 10,011,737 | B2 * | 7/2018 | Zhou ................ C09D 169/005 |
| 2001/0051706 | A1 | 12/2001 | George et al. |
| 2002/0086154 | A1 | 7/2002 | Miller et al. |
| 2002/0103329 | A1 | 8/2002 | Koldijk et al. |
| 2003/0083425 | A1 | 5/2003 | Morimoto et al. |
| 2003/0113462 | A1 | 6/2003 | Hirose et al. |
| 2003/0205852 | A1 | 11/2003 | Porter |
| 2004/0024140 | A1 | 2/2004 | Fujita et al. |
| 2004/0087736 | A1 | 5/2004 | Wu et al. |
| 2005/0176859 | A1 | 8/2005 | Tinkl et al. |
| 2006/0079650 | A1 | 4/2006 | Stevenson et al. |
| 2006/0286383 | A1 | 12/2006 | Gilmer |
| 2007/0020557 | A1 | 1/2007 | Yao et al. |
| 2007/0092746 | A1 | 4/2007 | Wayton et al. |
| 2007/0232778 | A1 | 10/2007 | Moody et al. |
| 2007/0276065 | A1 | 11/2007 | Barton et al. |
| 2008/0092776 | A1 | 4/2008 | Stockl et al. |
| 2008/0135060 | A1 | 6/2008 | Kuo et al. |
| 2008/0139687 | A1 | 6/2008 | Woods et al. |
| 2009/0047524 | A1 | 2/2009 | Yaoi et al. |
| 2009/0110843 | A1 | 4/2009 | Halahmi et al. |
| 2010/0159176 | A1 | 6/2010 | Hale et al. |
| 2010/0204363 | A1 | 8/2010 | Marsh et al. |
| 2010/0204388 | A1 * | 8/2010 | Marsh ................ C09D 133/062 |
| | | | 524/513 |
| 2010/0204392 | A1 | 8/2010 | Marsh et al. |
| 2010/0204401 | A1 | 8/2010 | Marsh et al. |
| 2010/0204413 | A1 | 8/2010 | Powell et al. |
| 2010/0297422 | A1 | 11/2010 | Lucas |
| 2011/0232002 | A1 | 9/2011 | Wiessner |
| 2011/0315591 | A1 | 12/2011 | Lespinasse et al. |
| 2012/0101187 | A1 | 4/2012 | Kuo et al. |
| 2012/0172520 | A1 | 7/2012 | Marsh et al. |
| 2012/0202920 | A1 | 8/2012 | Marsh et al. |
| 2012/0264669 | A1 | 10/2012 | Cristobal et al. |
| 2013/0023604 | A1 | 1/2013 | Kuo et al. |
| 2013/0072628 | A1 | 3/2013 | Crawford et al. |
| 2013/0296470 | A1 | 11/2013 | Marsh et al. |
| 2013/0296488 | A1 | 11/2013 | Marsh et al. |
| 2013/0324640 | A1 | 12/2013 | Parish |
| 2014/0018496 | A1 | 1/2014 | Kuo et al. |
| 2014/0128265 | A1 | 5/2014 | Wacker |
| 2014/0256852 | A1 | 9/2014 | Vandezande et al. |
| 2014/0296406 | A1 | 10/2014 | Marsh et al. |
| 2014/0296407 | A1 | 10/2014 | Marsh et al. |
| 2014/0303283 | A1 | 10/2014 | Ding et al. |
| 2014/0303303 | A1 | 10/2014 | Benson |
| 2014/0348776 | A1 | 11/2014 | Palmer, Jr. et al. |
| 2015/0034522 | A1 | 2/2015 | Itou et al. |
| 2015/0099827 | A1 | 4/2015 | Hagiwara et al. |
| 2015/0099837 | A1 | 4/2015 | Argyropoulos et al. |
| 2016/0115274 | A1 | 4/2016 | Kuo et al. |
| 2016/0115345 | A1 | 4/2016 | Kuo et al. |
| 2016/0115347 | A1 | 4/2016 | Kuo et al. |
| 2016/0115348 | A1 | 4/2016 | Kuo et al. |
| 2016/0280956 | A1 | 9/2016 | Kuo et al. |
| 2016/0340471 | A1 | 11/2016 | Zhou et al. |
| 2017/0088665 | A1 | 3/2017 | Inglefiled et al. |

FOREIGN PATENT DOCUMENTS

| | | |
|---|---|---|
| CA | 2 111 927 A1 | 6/1994 |
| EP | 1 273 626 A1 | 1/2003 |
| EP | 1 647 564 | 4/2006 |
| EP | 2365036 A1 | 9/2011 |
| GB | 1 044 015 | 9/1966 |
| GB | 1 115 189 A | 5/1968 |
| GB | 1 130 558 | 10/1968 |
| GB | 2 025 998 B | 10/1982 |
| JP | 03-038281 | 2/1991 |

(56) References Cited

FOREIGN PATENT DOCUMENTS

| | | |
|---|---|---|
| JP | 08-073781 | 3/1996 |
| JP | 09-003341 | 1/1997 |
| JP | 2002-235038 | 8/2002 |
| JP | 2004-339493 A | 12/2004 |
| JP | 2006-233068 | 9/2006 |
| WO | WO 93/04125 | 3/1993 |
| WO | WO 94/01506 | 1/1994 |
| WO | WO 94/12557 | 6/1994 |
| WO | WO 95/01407 | 1/1995 |
| WO | WO 96/33229 | 10/1996 |
| WO | WO 01/48097 A1 | 7/2001 |
| WO | WO 02/066541 A1 | 8/2002 |
| WO | WO 2006/083343 | 8/2006 |
| WO | WO 2006/138198 | 12/2006 |
| WO | WO 2007/001567 | 1/2007 |
| WO | WO 2007/001571 A1 | 1/2007 |
| WO | WO 2007/078851 | 7/2007 |
| WO | WO 2009/085097 A1 | 7/2009 |
| WO | WO 2009/156457 A1 | 12/2009 |
| WO | WO 2013/098218 A1 | 7/2013 |
| WO | WO 2014/203857 A1 | 12/2014 |
| WO | WO 2015/156094 A1 | 10/2015 |

OTHER PUBLICATIONS

International Search Report and Written Opinion for PCT/US2010/000212 dated Apr. 7, 2010.
International Search Report and Written Opinion for PCT/US2010/000213 dated Apr. 8, 2010.
International Search Report and Written Opinion for PCT/US2010/000214 dated Apr. 7, 2010.
International Search Report and Written Opinion for PCT/US2010/000215 dated Apr. 7, 2010.
International Search Report and Written Opinion for PCT/US2010/000216 dated Mar. 19, 2010.
International Search Report and Written Opinion for PCT/US2015/057524 dated Jun. 17, 2016.
Anonymous, "The Use of Cycloaliphatic Diacids and Anhydrides as Monomers for Polyester Polymers to Improve their Compatibility with Acrylic Polymers", Research Disclosure, 360, (1994), pp. 229-230.
Couchman, P. R.; "Compositional Variation of Glass-Transition Temperatures. 2. Application of the Thermodynamic Theory to Compatible Polymer Blends"; Macromolecules 1978, 11(6); pp. 1156-1161.
Heidt, et al., "Florida weathering of Isophthalic Acid-Based, Melamine-Crosslinked Polyester Coatings", Proceedings of the Twenty-Seventh International Waterborne, High Solids and Powder Coatings Symposium (2000), $27^{th}$ 295-307.
Husbands, M.J., et al., "Polyester Resins", A Manual of Resins for Surface Coatings, vol. III, pp. 63-167.
Jorissen, D.A., et al., "Higher Solids Polyurethane Coatings", Proceedings of the International Waterborne, High-Solids and Powder Coatings Symposium, (1992), 19th ed. pp. 182-195.
"Coating Processes (Powder Technology)"; Kirk-Othmer Encyclopedia of Chemical Technology, $4^{th}$ Edition, vol. 6, p. 641.
Ni, Hai, et al., "Cycloaliphatic Polyester Based High Solids Polyurethane Coatings: I. The Effect of Difunctional Alcohols", Journal of Coatings Technology, vol. 74, No. 928 (2002), pp. 49-56.
Oldring, P.K.T., et al., "Vinyl and Acrylic Monomers", A Manual of Resins for Surface Coatings, vol. II, pp. 121-210.
Oldring, P.K.T. et al.; Resins for Surface Coatings; vol. III; pp. 63-167; SITA Technology; London, UK; 1987.
Seo, Kab S., et al. "Drying Characteristics and Rheology of Carboxymethylcellulose Acetate Butyrate in Waterborne Coatings", Proceedings of the Thirty First International Waterborne, High-Solids, and Powder Coatings Symposium (2004), pp. 221-236.
Vandevoorde, P., et al. "Making solid gains Novel acrylic and polyester polyols reduce VOCs in solventborne urethanes", European Coatings Journal (2005) (9) pp. 22-24, 26-29.
Wicks, Zeno Jr., et al., "Polyester Resins", Organic Coatings Science and Technology, $2^{nd}$ ed., 13, (1999), p. 246-257.
Co-pending U.S. Appl. No. 14/026,424, filed Sep. 13, 2013, Kuo et al. (Publication 2014-0018496).
Non-Final Office Action dated Nov. 16, 2015 received in co-pending U.S. Appl. No. 14/026,424.
Final Office Action dated Mar. 3, 2016 received in co-pending U.S. Appl. No. 14/026,424.
Co-pending U.S. Appl. No. 15/172,288, filed Jun. 3, 2016, Kuo et al. (Publication 2016-0280956).
Non-Final Office Action dated Apr. 27, 2017 received in co-pending U.S. Appl. No. 15/172,288.
Co-pending U.S. Appl. No. 14/524,509, filed Oct. 27, 2014, Kuo et al. (Publication 2016-0115274; now U.S. Pat. No. 9,487,619).
Non-Final Office Action dated Sep. 28, 2015 received in co-pending U.S. Appl. No. 14/524,509.
Notice of Allowance dated Mar. 10, 2016 received in co-pending U.S. Appl. No. 14/524,509.
Notice of Allowance dated Jun. 10, 2016 received in co-pending U.S. Appl. No. 14/524,509.
Co-pending U.S. Appl. No. 14/524,514, filed Oct. 27, 2014, Kuo et al. (Publication 2016-0115348; now U.S. Pat. No. 9,650,539).
Non-Final Office Action dated May 6, 2016 received in co-pending U.S. Appl. No. 14/524,514.
Notice of Allowance dated Mar. 8, 2017 received in co-pending U.S. Appl. No. 14/524,514.
Co-pending U.S. Appl. No. 14/540,490, filed Nov. 13, 2014, Kuo et al. (Publication 2016-0137877; now U.S. Pat. No. 9,598,602).
Non-Final Office Action dated May 12, 2016 received in co-pending U.S. Appl. No. 14/540,490.
Notice of Allowance dated Sep. 8, 2016 received in co-pending U.S. Appl. No. 14/540,490.
Notice of Allowance dated Dec. 30, 2016 received in co-pending U.S. Appl. No. 14/540,490.
Co-pending U.S. Appl. No. 14/683,278, filed Apr. 10, 2015, Kuo et al. (Publication 2016-0115345).
Non-Final Office Action dated May 4, 2016 received in co-pending U.S. Appl. No. 14/683,278.
Co-pending U.S. Appl. No. 14/716,027, filed May 19, 2015, Zhou et al. (Publication 2016-0340471).
Non-Final Office Action dated Feb. 7, 2017 received in co-pending U.S. Appl. No. 14/716,027.
Final Office Action dated Oct. 12, 2017 received in co-pending U.S. Appl. No. 14/716,027.
Non-Final Office Action dated May 30, 2018 received in co-pending U.S. Appl. No. 14/716,027.
Co-pending U.S. Appl. No. 14/865,112, filed Sep. 25, 2015, Inglefield et al. (Publication 2017-0088665).
Non-Final Office Action dated Apr. 21, 2017 received in co-pending U.S. Appl. No. 14/865,112.
Co-pending U.S. Appl. No. 15/701,965, filed Sep. 12, 2017, Inglefield et al.
Co-pending U.S. Appl. No. 14/922,846, filed Oct. 26, 2016, Kuo et al. (Publication 2016-0115347).
Co-pending U.S. Appl. No. 15/078,537, filed Mar. 23, 2016, Zhou et al.
Non-Final Office Action dated Jul. 11, 2017 received in co-pending U.S. Appl. No. 15/078,537.
Final Office Action dated Jan. 12, 2018 received in co-pending U.S. Appl. No. 15/078,537.
Notice of Allowance dated May 1, 2018 received in co-pending U.S. Appl. No. 15/078,537.
International Search Report and Written Opinion for PCT/US2015/057529 dated Jan. 27, 2016.
International Search Report and Written Opinion for PCT/US2012/045357 dated Sep. 24, 2012.
ASTM D522; Standard Test Methods for Mandrel Bend Test of Attached Organic Coatings.
ASTM D1639-90; Standard Test Method for Acid Value of Organic Coating Materials.
ASTM D2794; Standard Test Method for Resistance of Organic Coatings to the Effect of Rapid Deformation (Impact).

(56) References Cited

OTHER PUBLICATIONS

ASTM D3281; Standard Test Method for Formability of Attached Organic Coatings with Impact-Wedge Bend Apparatus.
ASTM D3359-09$^{e2}$; Standard Test Methods for Measuring Adhesion by Tape Test.
ASTM D3363; Standard Test Method for Film Hardness by Pencil Test.
ASTM D3418; Standard Test Method for Transition Temperatures and Enthalpies of Fusion and Crystallization of Polymers by Differential Scanning Calorimetry.
ASTM D4274-11; Standard Test Methods for Testing Polyurethane Raw Materials: Determination of Hydroxyl Numbers of Polyols.
ASTM D4287; Standard Test Method for High-Shear Viscosity Using a Cone/Plate Viscometer.
ASTM D4366; Standard Test Method for Hardness of Organic Coatings by Pendulum Damping Tests.
ASTM D4752-10; Standard Practice for Measuring MEK Resistance of Ethyl Silicate (Inorganic) Zinc-Rich Primers by Solvent Rub.
ASTM D5402-15; Standard Practice for Assessing the Solvent Resistance of Organic Coatings Using Solvent Rubs.
ASTM D6279; Standard Test Method for Rub Abrasion Mar Resistance of High Gloss Coatings.
Biedermann et al.; "Phenolic resins for can coatings: II. Resoles based on cresol/phenol mixtures of tert. butyl phenol"; LWT—Food Science and Technology; 39; (2006); pp. 647-659 (Elsevier).
Narayan et al.; "Properties of acetoacetylated hydroxylated polyesters based polyurethane coatings"; Progress in Organic Coatings; 45; (2002); pp. 59-67.
The Chemisty of Polyurethane Coatings, Technical Publication, p. 20, by Bayer Material Science, 2005.
Witzeman et al.; "Comparison of Methods for the Preparation of Acetoacetylated Coating Resins"; Journal of Coatings Technology; vol. 62; No. 789; Oct. 1990; pp. 101-112.
Zhang, Musan et al.; "Tailoring adhesive performance of sulfonated segmented block copolymers"; Database CA [Online]; Chemical Abstracts Service; XP002682877.
International Search Report and Written Opinion for PCT/US2016/32646 dated Aug. 16, 2016.
International Search Report and Written Opinion for PCT/US16/52810 dated Dec. 15, 2016.
Co-pending U.S. Appl. No. 15/435,353, filed Feb. 17, 2017, Dziczkowski et al.
Dyab et al.; "Non-Aqueous Emulsions Stabilised by Nonionic Nonyl Phenol Ethoxylate Reactive Polymerisable Surfactants"; International Journal of Electrochemical Science; 8; 2013; pp. 9868-9885.
Stepan Product Bulletin for MAKON® TSP-12, TSP-16, TSP-20, TSP-25, TSP-40 & TSP-60.
Vogel et al.; "Near-Zero VOC Waterborne Alkyd Dispersions with Solventborne Alkyd Performance"; CoatingsTech; Jun. 2016; pp. 29-39.
International Search Report and Written Opinion for PCT/US2017/018563 dated Apr. 6, 2017.
International Search Report and Written Opinion for PCT/US2017/022885 dated May 25, 2017.
Non-Final Office Action dated May 23, 2019 received in co-pending U.S. Appl. No. 15/701,965.
European Search Report dated Mar. 26, 2019 received in European Application No. 16849473.0.
Notice of Allowance dated Oct. 24, 2019 received in co-pending U.S. Appl. No. 15/701,965.

\* cited by examiner

ALIPHATIC POLYESTER COATING COMPOSITIONS CONTAINING TETRAMETHYL CYCLOBUTANEDIOL

This application is a divisional application of and claims priority to U.S. application Ser. No. 14/716,027, filed on May 19, 2015, the contents of which are incorporated herein by reference in their entirety.

FIELD OF THE INVENTION

This invention pertains to aliphatic, curable polyesters for solvent-borne, thermosetting, single coating compositions. Particularly, this invention pertains to curable polyesters containing 2,2,4,4-tetraalkylcyclobutane-1,3-diol (TACD) and high-solids, solvent-borne thermosetting mono-coating compositions prepared from these polyesters. These polyesters can be used in blends with acrylic resins or serve as the primary film former in a coating formulation.

BACKGROUND OF THE INVENTION

Solvent-borne, polyester thermosetting coatings that exhibit high hardness are commercially desirable. Coatings with high hardness typically exhibit high gloss, good distinctness of image (DOI), fast dry-times, scratch, stain, chemical, and humidity resistance, and outdoor durability.

Aliphatic polyesters are frequently used to reduce viscosity and increase solids for thermosetting acrylic (abbreviated herein as "TSA") coatings. Aliphatic polyesters also are useful as a primary film former in high solids coatings because of their ability to reduce volatile organic compound ("VOC") emissions. Coatings made from aliphatic polyesters are generally flexible but tend to be soft, which results in poor resistance to solvents and chemicals, poor humidity resistance and poor outdoor durability.

Hardness and hardness-related properties of aliphatic polyester resins sometimes can be improved with the addition of 1,4-cyclohexanedimethanol (abbreviated herein as "CHDM") and hydrogenated bisphenol A (abbreviated herein as "HBPA"). Unfortunately, poor solvent solubility and compatibility with acrylic resins often are observed as CHDM content is increased in the polyester resin formulation. The amount of CHDM that can be incorporated into the resin formulation, therefore is limited. HBPA is know to exhibit similar characteristics.

Poor resin solubility often manifests itself over time by phase separation, precipitation of the resin from solution, and the development of hazy to opaque resin solutions. These characteristics are undesirable and limit the storage stability of the resin solution and the coatings formulated from these solutions. Such coatings, for example, may experience a viscosity increase, phase separation, agglomeration of ingredients, etc., that result in an undesirable higher application viscosity, poor appearance and poor mechanical properties of the cured film.

Thermosetting acrylic ("TSA") resins are widely used in industrial coatings. They can be formulated to a high glass transition temperature (Tg) and exhibit excellent light stability and hydrolysis resistance. These properties result in coatings with the desirable characteristics of high hardness; fast dry times; resistance to stains, chemicals and humidity; and good outdoor durability. Consequently, TSA resins often serve as the primary film-former in coatings for demanding applications that include transportation, maintenance, marine and building/construction markets.

Although TSA resins exhibit many desirable properties, they often lack flexibility and require more solvent in the coating formulation to achieve a practical application viscosity. The higher solvent requirement for TSA resins makes it difficult to achieve high solids coatings with reduced VOC content as mandated by various federal and state air quality organizations.

To increase resin and coating solids, reduce viscosity, and lower VOC emission, aliphatic polyester resins can be blended with TSA resins. Unfortunately, the glass transition temperature ("Tg") of the blend frequently decreases significantly as the polyester content increases. The lower Tg of the blend has an adverse impact on the desirable characteristics that the TSA resin imparts to the coating.

Automotive coatings have gradually shifted from one layer monocoat system after primer to two layer system—basecoat and clearcoat—for an improved appearance and improved durability. However, environmental compliance has resulted in the paint industry attempting to move towards greener and more "eco-friendly" products with similar performance attributes. Increases in the total solids content or replacement of certain organic solvents with water are two alternatives available to limit the amount of volatile organic compounds (VOC) in the paint formulation. Consolidated paint processes which eliminates or shorten bake and flash time in attempt to reduce energy consumption and operating cost. Accordingly, monocoat systems have found renewed interest by industry. A monocoat paint system reduces painting time and energy use by cutting the number of paint applications from three to two and the number of drying procedures from two to one. The reduction in paint and energy consumed means reduced carbon dioxide and particulate emissions compared with conventional paint processes.

There is a need in the coatings industry for aliphatic polyesters that exhibit good hardness with good flexibility and solubility when formulated into thermosetting coatings compositions. In addition, there is a need for aliphatic polyester resins that, when blended with TSA resins, lower the viscosity while maintaining the Tg of the TSA resin in high solids, thermosetting coating compositions.

SUMMARY OF THE INVENTION

The present invention provides curable, aliphatic polyesters prepared from 2,2,4,4-tetraalkylcyclobutane-1,3-diol. One aspect of the invention is a curable, aliphatic polyester, comprising residues of:
i. hydroxyl component comprising the residues of:
  a. from 5 to 45 mole %, based on the total moles of (a) and (b), of 2,2,4,4-tetraalkylcyclobutane-1,3-diol (TACD);
  b. from 55 to 95 mole % based on the total moles of (a) and (b), of a diol other than TACD; and
  c. from 3 to 35 mole %, based on the total moles of (a), (b) and (c), of a polyol;
ii. a diacid component comprising the residues of:
  d. from 60 to 90 mole %, based on the total moles of the diacids of an alicyclic diacid; and
  e. from 10 to 40 mole %, based on the total moles of the diacids an acyclic aliphatic diacid;
  wherein the curable polyester contains diacid residues in an amount of at least 90 mole % of aliphatic diacid residues, based on the total moles of all diacid residues in the curable polyester, and, wherein the curable polyester has a hydroxyl number of 50 to 450 mgKOH/g of polyester, an acid number of 0 to 80 mgKOH/g, and a number average molecular weight of 300 to 10,000 g/mole of polyester.

In another aspect, a thermosetting coating solution comprising:

A. 50 to 90 weight percent, based on the total weight of (A) and (B) of at least one curable, aliphatic polyester, comprising residues of:
  i. hydroxyl component comprising the residues of:
    a. from 5 to 45 mole %, based on the total moles of (a) and (b), of 2,2,4,4-tetraalkylcyclobutane-1,3-diol (TACD);
    b. from 55 to 95 mole % based on the total moles of (a) and (b), of a diol other than TACD; and
    c. from 3 to 35 mole %, based on the total moles of (a), (b) and (c), of a polyol;
  ii. a diacid component comprising the residues of:
    d. from 60 to 90 mole %, based on the total moles of the diacids (d) and (e), of an alicyclic diacid; and
    e. from 10 to 40 mole %, based on the total moles of the diacids (d) and (e), of an acyclic aliphatic diacid;
  wherein the curable polyester contains diacid residues in an amount of at least 90 mole % of aliphatic diacid residues, based on the total moles of all diacid residues in the curable polyester, and, wherein the curable polyester has a hydroxyl number of 50 to 450 mgKOH/g of polyester, an acid number of 0 to 80 mgKOH/g, and a number average molecular weight of 300 to 10,000 g/mole of polyester; and B. from 10 to 50 weight percent, based on the total weight of the solution, of a solvent other than water.

In another aspect of the present invention, coatings can be formulated from these curable aliphatic polyester resins which exhibit high gloss, distinctness of image and reflectivity; good hardness with good flexibility; solvent and chemical resistance; and good gloss retention during UV and humidity exposure for good outdoor durability. Thus, another embodiment of our invention is a thermosetting monocoat coating composition, comprising:

A. 50 to 90 weight percent, based on the total weight of (A) and (C), of at least one curable, aliphatic polyester, comprising residues of:
  i. hydroxyl component comprising the residues of:
    a. from 5 to 45 mole %, based on the total moles of (a) and (b), of 2,2,4,4-tetraalkylcyclobutane-1,3-diol (TACD);
    b. from 55 to 95 mole % based on the total moles of (a) and (b), of a diol other than TACD; and
    c. from 3 to 35 mole %, based on the total moles of (a), (b) and (c), of a polyol;
  ii. a diacid component comprising the residues of:
    d. from 60 to 90 mole %, based on the total moles of the diacids (d) and (e), of an alicyclic diacid; and
    e. from 10 to 40 mole %, based on the total moles of the diacids (d) and (e), of an acyclic aliphatic diacid;
  wherein the curable polyester contains diacid residues in an amount of at least 90 mole % of aliphatic diacid residues, based on the total moles of all diacid residues in the curable polyester, and, wherein the curable polyester has a hydroxyl number of 50 to 450 mgKOH/g of polyester, an acid number of 0 to 80 mgKOH/g, and a number average molecular weight of 300 to 10,000 g/mole of polyester; and B. from 10 to 50 weight percent, based on the total weight of the coating composition, of a solvent other than water; and C. from 10 to 50 weight percent, based on the total weight of (A) and (C), of a crosslinker comprising an aminoplast and/or isocyanate.

The aliphatic polyesters may be blended with acrylics or serve as the primary film former to formulate factory and field-applied coatings used in auto OEM, auto refinish, transportation, aerospace, maintenance, marine, machinery and equipment, general metal, appliance, metal furniture, plastic and building/construction applications. When blended with thermosetting acrylic (TSA) resins, our aliphatic polyesters exhibit good solubility, compatibility and viscosity reduction with good Tg retention of the blend.

Another aspect of the invention is a method for applying a thermosetting monocoat coating composition to a substrate comprising:

I. providing a suitable substrate for coating;
II. providing a thermosetting monocoat coating composition comprising:
  A. 50 to 90 weight percent, based on the total weight of (A) and (C), of at least one curable, aliphatic polyester, comprising residues of:
    i. hydroxyl component comprising the residues of:
      a. from 5 to 45 mole %, based on the total moles of (a) and (b), of 2,2,4,4-tetraalkylcyclobutane-1,3-diol (TACD);
      b. from 55 to 95 mole % based on the total moles of (a) and (b), of a diol other than TACD; and
      c. from 3 to 35 mole %, based on the total moles of (a), (b) and (c), of a polyol;
    ii. a diacid comprising the residues of:
      d. from 60 to 90 mole %, based on the total moles of the diacids (d) and (e), of an alicyclic diacid; and
      e. from 10 to 40 mole %, based on the total moles of the diacids (d) and (e), of an acyclic aliphatic diacid;
  wherein the curable polyester contains diacid residues in an amount of at least 90 mole % of aliphatic diacid residues, based on the total moles of all diacid residues in the curable polyester, and, wherein the curable polyester has a hydroxyl number of 50 to 450 mgKOH/g of polyester, an acid number of 0 to 80 mgKOH/g, and a number average molecular weight of 300 to 10,000 g/mole of polyester; and
  B. from 10 to 50 weight percent, based on the total weight of the coating composition, of a solvent other than water; and
  C. from 10 to 50 weight percent, based on the total weight of (A) and (C), of a crosslinker comprising an aminoplast and/or isocyanate;
III. applying the thermosetting monocoat coating composition to the substrate to produce a coated substrate; and
IV. applying heat to the coated substrate to a predetermined temperature and for a predetermined time to produce a cured coating.

DETAILED DESCRIPTION

Surprisingly, it has been discovered that curable, aliphatic polyesters that contain 2,2,4,4-tetraalkylcyclobutane-1,3-diol (TACD), and more particularly, 2,2,4,4-tetramethyl-1, 3-cyclobutanediol (abbreviated herein as "TMCD") can be used to prepare solvent-borne, high-solids, thermosetting coatings that exhibit high gloss, good hardness and flexibility; and solvent and chemical resistance. These aliphatic polyesters also can be blended with thermosetting acrylic resins ("TSA") to produce blends that have low viscosity, good compatibility, flexibility, and Tg retention.

Curable, Aliphatic Polyester

In accordance with one aspect of the present invention is a curable, aliphatic polyester, comprising:
  i. a hydroxyl component comprising the residues of:
  a. from 5 to 45 mole %, based on the total moles of (a) and (b), of 2,2,4,4-tetraalkylcyclobutane-1,3-diol (TACD);
  b. from 55 to 95 mole % based on the total moles of (a) and (b), of a diol other than TACD; and
  c. from 3 to 35 mole %, based on the total moles of (a), (b) and (c), of a polyol;
  ii. a diacid component comprising the residues of:
  d. from 60 to 90 mole %, based on the total moles of the diacids of an alicyclic diacid; and
  e. from 10 to 40 mole %, based on the total moles of the diacids an acyclic aliphatic diacid;
  wherein the curable polyester contains diacid residues in an amount of at least 90 mole % of aliphatic diacid residues, based on the total moles of all diacid residues in the curable polyester, and, wherein the curable polyester has a hydroxyl number of 50 to 450 mgKOH/g of polyester, an acid number of 0 to 80 mgKOH/g, and a number average molecular weight of 300 to 10,000 g/mole of polyester.

Unless otherwise indicated, all numbers expressing quantities of ingredients, properties such as molecular weight, reaction conditions, and so forth used in the specification and claims are to be understood as being modified in all instances by the term "." Unless indicated to the contrary, the numerical parameters set forth in the following specification and attached claims are approximations that may vary depending upon the desired properties sought to be obtained by the present invention. At the very least, each numerical parameter should be construed in light of the number of reported significant digits and by applying ordinary rounding techniques. Further, the ranges stated in this disclosure and the claims are intended to include the entire range specifically and not just the endpoint(s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.1113, etc., and the endpoints 0 and 10. Also, a range associated with chemical substituent groups such as, for example, "$C_1$ to $C_5$ diols", is intended to specifically include and disclose $C_1$, $C_2$, $C_3$, $C_4$ and $C_5$ diols.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in its respective testing measurements.

As used in the specification and the appended claims, the singular forms "a," "an" and "the" include their plural referents unless the context clearly dictates otherwise. For example, a reference to a "polyester," a "dicarboxylic acid", a "residue" is synonymous with "at least one" or "one or more" polyesters, dicarboxylic acids, or residues and is thus intended to refer to both a single or plurality of polyesters, dicarboxylic acids, or residues. In addition, references to a composition "comprising", "containing", "having" or "including" "an" ingredient or "a" polyester is intended to include other ingredients or other polyesters, respectively, in addition to the specifically identified ingredient or residue. Accordingly, the terms "containing", "having" or "including" are intended to be synonymous and may be used interchangeably with the term "comprising", meaning that at least the named compound, element, particle, or method step, etc., is present in the composition or article or method, but does not exclude the presence of other compounds, catalysts, materials, particles, method steps, etc, even if the other such compounds, material, particles, method steps, etc., have the same function as what is named, unless expressly excluded in the claims.

Also, it is to be understood that the mention of one or more process steps does not preclude the presence of additional process steps before or after the combined recited steps or intervening process steps between those steps expressly identified. Moreover, the lettering of process steps or ingredients is a convenient means for identifying discrete activities or ingredients and the recited lettering can be arranged in any sequence, unless otherwise indicated.

The term "curable, aliphatic polyester", as used herein, is synonymous with the term "resin" and is intended to mean a thermosetting surface coating polymer prepared by the polycondensation of one or more acid components and hydroxyl components. The curable, aliphatic polyester of the present invention is a thermoset polymer and is suitable as a resin for solvent-based coatings and more specifically mono-coat applications. This polyester has a low molecular weight, typically 500 to 10,000 daltons, and would not be suitable for fabrication films, sheets, and other shaped objects by extrusion, casting, blow molding, and other thermoforming processes commonly used for high molecular weight thermoplastic polymers. The polyester has a reactive functional group, typically a hydroxyl group or carboxyl group for the purpose of later reacting with a crosslinker in a coating formulation.

The functional group is controlled by having either excess diol or acid (from dicarboxylic acid or tricarboxylic acid) in the polyester resin composition. The desired crosslinking pathway will determine whether the polyester resin will be hydroxyl-terminated or carboxylic acid-terminated. This concept is known to those skilled in the art and described, for example, in *Organic Coatings Science and Technology*, 2nd ed., p. 246-257, by Z. Wicks, F. Jones, and S. Pappas, Wiley, New York, 1999, the entire disclosure of which is incorporated herein by reference.

Typically, the acid component comprises at least one dicarboxylic acid and may, optionally, include mono- and polybasic carboxylic acids. For example, the curable, aliphatic polyester may be prepared from an acid component comprising an aliphatic or cycloaliphatic dicarboxylic acid such as, for example, adipic acid or 1,3-cyclohexanedicarboxylic acid, or a mixture of one or more aliphatic and cycloaliphatic acids. The hydroxyl component comprises diols and polyols. The diols may comprise one or more cycloaliphatic diols such as, for example, 2,2,4,4-tetramethyl-1,3-cyclobutanediol, either alone or in combination with one or more linear or branched aliphatic diols such as, for example, neopentyl glycol. Catalysts may be used to accelerate the rate of the polycondensation reaction. Additional examples of acid components and hydroxyl components, other than TMCD of the curable, aliphatic polyester include those known in the art including, but not limited to, those discussed below, and in various documents known in the art such as, for example, in *Resins for Surface Coatings*, Vol. III, p. 63-167, ed. by P. K. T. Oldring and G Hayward, SITA Technology, London, U K, 1987, the disclosure of which is incorporated herein by reference.

The term "residue", as used herein in reference to the polymers of the invention, means any organic structure incorporated into a polymer through a polycondensation or ring opening reaction involving the corresponding monomer. It will also be understood by persons having ordinary skill in the art, that the residues associated within the various curable polyesters of the invention can be derived from the parent monomer compound itself or any derivative of the parent compound. For example, the dicarboxylic acid residues referred to in the polymers of the invention may be derived from a dicarboxylic acid or its associated acid halides, esters, salts, anhydrides, or mixtures thereof. Thus, as used herein, the term "dicarboxylic acid" is intended to include dicarboxylic acids and any derivative of a dicarboxylic acid, including its associated acid halides, esters, half-esters, salts, half-salts, anhydrides, and mixtures thereof, useful in a polycondensation process with a diol to make a curable, aliphatic polyester.

The term "aliphatic" is intended to have its common meaning as would be understood by persons having ordinary skill in the art, that is, acyclic or cyclic, saturated or unsaturated carbon compounds, excluding benzenoid or other aromatic systems. The term "cycloaliphatic", as used herein, is intended to mean an aliphatic, cyclic compound. The term "aliphatic polyester", as used herein, is understood to mean a polyester that contains 90 mole percent or greater aliphatic diacid or diol residues, based on the total moles of diacid or diol residues. Small amounts, such as less than 10 mole %, or less than 9 mole %, or less than 8 mole %, or less than 5 mole %, or less than 3 mole %, or less than 2 mole %, or less than 1 mole % of aromatic dicarboxylic acids residues or aromatic diol residues also may be present in the curable, aliphatic polyester. Desirably, the curable, aliphatic polyester is essentially free, i.e., having less than 1 mole % of aromatic diacid and/or aromatic diol residues. The curable, aliphatic polyester also comprises (a) from 5 mole % to 45 mole %, based on the total moles of (a) and (b) discussed herein, of the residues of 2,2,4,4-tetraalkylcyclobutane-1,3-diol (TACD). Alternatively, the curable, aliphatic polyester can comprise from 5 mole % to 40 mole %, based on the total moles of (a) and (b); or from 10 mole % to 40 mole %, based on the total moles of (a) and (b); or from 15 mole % to 40 mole %, based on the total moles of (a) and (b); or from 17 mole % to 30 mole %, based on the total moles of (a) and (b); or from 20 mole % to 30 mole %, based on the total moles of (a) and (b); or from 25 mole % to 30 mole %, based on the total moles of (a) and (b) of TACD residues.

The TACD compounds can be represented by the general structure below:

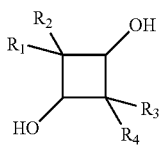

wherein R1, R2, R3, and R4 each independently represent an alkyl radical, for example, a lower alkyl radical having 1 to 8 carbon atoms; or 1 to 6 carbon atoms, or 1 to 5 carbon atoms, or 1 to 4 carbon atoms, or 1 to 3 carbon atoms, or 1 to 2 carbon atoms, or 1 carbon atom. The alkyl radicals may be linear, branched, or a combination of linear and branched alkyl radical. Desirably, the polyhydroxyl compounds are hydrocarbons and do not contain atoms other than hydrogen, carbon and oxygen. Examples of suitable diols "(a)" include 2,2,4,4-tetramethylcyclobutane-1,3-diol, 2,2,4,4-tetraethylcyclobutane-1,3-diol, 2,2,4,4-tetra-n-propylcyclobutane-1, 3-diol, 2,2,4,4-tetra-n-butylcyclobutane-1,3-diol, 2,2,4,4-tetra-n-pentylcyclobutane-1,3-diol, 2,2,4,4-tetra-n-hexylcyclobutane-1,3-diol, 2,2,4,4-tetra-n-heptylcyclobutane-1,3-diol, 2,2,4,4-tetra-n-octylcyclobutane-1,3-diol, 2,2-dimethyl-4,4-diethylcyclobutane-1,3-diol, 2-ethyl-2,4,4-trimethylcyclobutane-1,3-diol, 2,4-dimethyl-2,4-diethylcyclobutane-1,3-diol, 2,4-dimethyl-2,4-di-n-propylcyclobutane-1,3-diol, 2,4-n-dibutyl-2,4-diethylcyclobutane-1,3-diol, 2,4-dimethyl-2,4-diisobutylcyclobutane-1,3-diol, and 2,4-diethyl-2,4-diisoamylcyclobutane-1,3-diol. Desirably, the diol is selected from 2,2,4,4-tetraalkylcyclobutane-1,3-diol, 2,2-dimethyl-1,3-propanediol (neopentyl glycol), 1,2 cyclohexanedimethanol, 1,3-cyclohexanedimethanol, 1,4 cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 2-ethyl-2-isobutyl-1,3-propanediol, 1,3-butanediol, 1,4-butanediol, 1,5-pentanediol, 1,6-hexanediol, 2,2,4,4-tetramethyl-1,6-hexanediol, 1,10-decanediol, 1,4-benzenedimethanol, ethylene glycol, propylene glycol, diethylene glycol, dipropylene glycol, triethylene glycol, tetraethylene glycol, and polyethylene glycol, and polyols such as 1,1,1-trimethylol propane, 1,1,1-trimethylolethane, glycerin, pentaerythritol, erythritol, threitol, dipentaerythritol, sorbitol, and combinations thereof. More desirably, the diol "(a)" is 2,2,4,4-tetramethyl-1,3-cyclobutanediol (TMCD), 2,2-dimethyl-1,3-propanediol (neopentyl glycol), 1,2-cyclohexanedimethanol, 1,3-cyclohexanedimethanol, 1,4-cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 1,4-butanediol, 1,6-hexanediol and mixtures thereof.

The diols (b) have 2 hydroxyl groups and can be branched or linear, saturated or unsaturated, aliphatic or cycloaliphatic $C_2$-$C_{20}$ compounds, the hydroxyl groups being primary, secondary, and/or tertiary, desirably primary. Examples of diols (b) include 2,2-dimethyl-1,3-propanediol (neopentyl glycol), 1,2 cyclohexane-dimethanol, 1,3-cyclohexanedimethanol, 1,4 cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 2-ethyl-2-isobutyl-1,3-propanediol, 1,3-butanediol, 1,4-butanediol, 1,5-pentanediol, 1,6-hexanediol, 2,2,4,4-tetramethyl-1,6-hexanediol, 1,10-decanediol, 1,4-benzenedimethanol, ethylene glycol, propylene glycol, diethylene glycol, dipropylene glycol, triethylene glycol, tetraethylene glycol, polyethylene glycol, 2,2-bis(hydroxymethyl)propionic acid (dimethylolpropionic acid) and mixtures thereof.

Alternatively, the diol (b) is selected from 2,2-dimethyl-1,3-propanediol (neopentyl glycol), 1,2-cyclohexanedimethanol, 1,3-cyclohexanedimethanol, 1,4-cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 1,4-butanediol, 1,6-hexanediol and mixtures thereof. Based on the total moles of the diol (b) in the curable aliphatic polyester, at least 15 mole % of (b) comprises neopentyl glycol, or at least 20 mole % neopentyl glycol, or at least 22 mole % neopentyl glycol, or at least 25 mole % neopentyl glycol, or at least 35 mole % neopentyl glycol, or at least 40 mole % neopentyl glycol, or at least 45 mole % neopentyl glycol, or at least 50 mole % neopentyl glycol, or at least 55 mole % neopentyl glycol, or at least 60 mole % neopentyl glycol, or at least 65 mole % neopentyl glycol, or at least 70 mole % neopentyl glycol, or at least 75 mole % neopentyl glycol, or at least 80 mole % neopentyl glycol, or at least 85 mole % neopentyl glycol, or at least 90 mole % neopentyl glycol, or the diol (b) is neopentyl glycol.

In accordance with the present invention, the curable, aliphatic polyester can include residues of TACD (a) from 30 to 40 mole % and the diol (b) from 60 to 70 mole %, based on the total mole of (a) and (b). Desirably, the molar ratio of (b) to (a) is from 1:1-2.5:1, or 1.3:1 to 2.5:1, or 1.5:1 to 2.0:1, or from 1.1:1 to 1.8:1. An important aspect of the present invention is that the molar quantity of residues of (a) is always less than the molar quantity of residues of (b) in the curable, aliphatic polyester. Although not to be bound by any theory, it is believed that the amount of diol (b) to TACD (a) is important in that when the mole % of (a) exceeds the mole % of (b) the monocoat coating described hereinbelow becomes brittle and if the amount of (b) is excessive, i.e., outside of the above molar ratios, then the monocoat coating described hereinbelow becomes too soft have reduced weatherability and mechanical properties.

The curable, aliphatic polyester further includes residues of from 3 to 35 mole %, based on the total moles of (a), (b) and (c), of a polyol (c) having 3 or more hydroxyl groups and can be branched or linear, saturated or unsaturated, aliphatic or cycloaliphatic $C_2$-$C_{20}$ compounds, the hydroxyl groups being primary, secondary, and/or tertiary. It is contemplated that at least two of the hydroxyl groups are primary. Moreover, the polyols are hydrocarbons and do not contain atoms other than hydrogen, carbon and oxygen. Non-limiting examples of suitable polyols include 1,1,1-trimethylolpropane (TMP), 1,1,1-trimethylolethane, glycerin, pentaerythritol, erythritol, threitol, dipentaerythritol, sorbitol, and mixtures thereof. Desirably, the residues from the polyol in the curable, aliphatic polyester is from 5 mole % to 35 mole %, or from 6 mole % to 35 mole %, or from 7 mole % to 35 mole %, or from 8 mole % to 35 mole %, or from 9 mole % to 35 mole %, or from 10 mole % to 35 mole %, or from 11 mole % to 35 mole %, or from 12 mole % to 35 mole %, or from 13 mole % to 35 mole %, or from 14 mole % to 35 mole %, or from 15 mole % to 35 mole %, or from 16 mole % to 35 mole %, or from 17 mole % to 35 mole %, or from 18 mole % to 35 mole %, or from 19 mole % to 35 mole %, or from 20 mole % to 35 mole %, or from 21 mole % to 35 mole %, or from 22 mole % to 35 mole %, or from 23 mole % to 35 mole %, or from 24 mole % to 35 mole %, or from 25 mole % to 35 mole %, or from 26 mole % to 35 mole %, or from 27 mole % to 35 mole %, or from 28 mole % to 35 mole %, or from 29 mole % to 35 mole %, or from 30 mole % to 35 mole %, or from 31 mole % to 35 mole %, or from 32 mole % to 35 mole %, or from 33 mole % to 35 mole %, or from 34 mole % to 35 mole %, or from 5 mole % to 34 mole %, or from 6 mole % to 34 mole %, or from 7 mole % to 34 mole %, or from 8 mole % to 34 mole %, or from 9 mole % to 34 mole %, or from 10 mole % to 34 mole %, or from 11 mole % to 34 mole %, or from 12 mole % to 34 mole %, or from 13 mole % to 34 mole %, or from 14 mole % to 34 mole %, or from 15 mole % to 34 mole %, or from 16 mole % to 34 mole %, or from 17 mole % to 34 mole %, or from 18 mole % to 34 mole %, or from 19 mole % to 34 mole %, or from 20 mole % to 34 mole %, or from 21 mole % to 34 mole %, or from 22 mole % to 34 mole %, or from 23 mole % to 34 mole %, or from 24 mole % to 34 mole %, or from 25 mole % to 34 mole %, or from 26 mole % to 34 mole %, or from 27 mole % to 34 mole %, or from 28 mole % to 34 mole %, or from 29 mole % to 34 mole %, or from 30 mole % to 34 mole %, or from 31 mole % to 34 mole %, or from 32 mole % to 34 mole %, or from 33 mole % to 34 mole %, or from 5 mole % to 33 mole %, or from 6 mole % to 33 mole %, or from 7 mole % to 33 mole %, or from 8 mole % to 33 mole %, or from 9 mole % to 33 mole %, or from 10 mole % to 33 mole %, or from 11 mole % to 33 mole %, or from 12 mole % to 33 mole %, or from 13 mole % to 33 mole %, or from 14 mole % to 33 mole %, or from 15 mole % to 33 mole %, or from 16 mole % to 33 mole %, or from 17 mole % to 33 mole %, or from 18 mole % to 33 mole %, or from 19 mole % to 33 mole %, or from 20 mole % to 33 mole %, or from 21 mole % to 33 mole %, or from 22 mole % to 33 mole %, or from 23 mole % to 33 mole %, or from 24 mole % to 33 mole %, or from 25 mole % to 33 mole %, or from 26 mole % to 33 mole %, or from 27 mole % to 33 mole %, or from 28 mole % to 33 mole %, or from 29 mole % to 33 mole %, or from 30 mole % to 33 mole %, or from 31 mole % to 33 mole %, or from 32 mole % to 33 mole %, or from 5 mole % to 32 mole %, or from 6 mole % to 32 mole %, or from 7 mole % to 32 mole %, or from 8 mole % to 32 mole %, or from 9 mole % to 32 mole %, or from 10 mole % to 32 mole %, or from 11 mole % to 32 mole %, or from 12 mole % to 32 mole %, or from 13 mole % to 32 mole %, or from 14 mole % to 32 mole %, or from 15 mole % to 32 mole %, or from 16 mole % to 32 mole %, or from 17 mole % to 32 mole %, or from 18 mole % to 32 mole %, or from 19 mole % to 32 mole %, or from 20 mole % to 32 mole %, or from 21 mole % to 32 mole %, or from 22 mole % to 32 mole %, or from 23 mole % to 32 mole %, or from 24 mole % to 32 mole %, or from 25 mole % to 32 mole %, or from 26 mole % to 32 mole %, or from 27 mole % to 32 mole %, or from 28 mole % to 32 mole %, or from 29 mole % to 32 mole %, or from 30 mole % to 32 mole %, or from 31 mole % to 32 mole %, or from 5 mole % to 31 mole %, or from 6 mole % to 31 mole %, or from 7 mole % to 31 mole %, or from 8 mole % to 31 mole %, or from 9 mole % to 31 mole %, or from 10 mole % to 31 mole %, or from 11 mole % to 31 mole %, or from 12 mole % to 31 mole %, or from 13 mole % to 31 mole %, or from 14 mole % to 31 mole %, or from 15 mole % to 31 mole %, or from 16 mole % to 31 mole %, or from 17 mole % to 31 mole %, or from 18 mole % to 31 mole %, or from 19 mole % to 31 mole %, or from 20 mole % to 31 mole %, or from 21 mole % to 31 mole %, or from 22 mole % to 31 mole %, or from 23 mole % to 31 mole %, or from 24 mole % to 31 mole %, or from 25 mole % to 31 mole %, or from 26 mole % to 31 mole %, or from 27 mole % to 31 mole %, or from 28 mole % to 31 mole %, or from 29 mole % to 31 mole %, or from 30 mole % to 31 mole %, or from 5 mole % to 30 mole %, or from 6 mole % to 30 mole %, or from 7 mole % to 30 mole %, or from 8 mole % to 30 mole %, or from 9 mole % to 30 mole %, or from 10 mole % to 30 mole %, or from 11 mole % to 30 mole %, or from 12 mole % to 30 mole %, or from 13 mole % to 30 mole %, or from 14 mole % to 30 mole %, or from 15 mole % to 30 mole %, or from 16 mole % to 30 mole %, or from 17 mole % to 30 mole %, or from 18 mole % to 30 mole %, or from 19 mole % to 30 mole %, or from 20 mole % to 30 mole %, or from 21 mole % to 30 mole %, or from 22 mole % to 30 mole %, or from 23 mole % to 30 mole %, or from 24 mole % to 30 mole %, or from 25 mole % to 30 mole %, or from 26 mole % to 30 mole %, or from 27 mole % to 30 mole %, or from 28 mole % to 30 mole %, or from 29 mole % to 30 mole %, or from 5 mole % to 29 mole %, or from 6 mole % to 29 mole %, or from 7 mole % to 29 mole %, or from 8 mole % to 29 mole %, or from 9 mole % to 29 mole %, or from 10 mole % to 29 mole %, or from 11 mole % to 29 mole %, or from 12 mole % to 29 mole %, or from 13 mole % to 29 mole %, or from 14 mole % to 29 mole %, or from 15 mole % to 29 mole %, or from 16 mole % to 29 mole %, or from 17 mole % to 29 mole %, or from 18 mole % to 29 mole %, or from 19 mole % to 29 mole %, or from 20 mole % to 29 mole %, or from 21 mole % to 29 mole %, or from 22 mole % to 29 mole %, or from 23 mole % to 29 mole %, or from 24 mole % to 29 mole %, or from 25 mole % to 29 mole %, or from 26 mole % to 29 mole %, or from 27 mole % to 29 mole %, or from 28 mole % to 29 mole %, or from 5 mole % to 28 mole %, or from 6 mole % to 28 mole %, or from 7 mole % to 28 mole %, or from 8 mole % to 28 mole %, or from 9 mole % to 28 mole %, or from 10 mole % to 28 mole %, or from 11 mole % to 28 mole %, or from 12 mole % to 28 mole %, or from 13 mole % to 28 mole %, or from 14 mole % to 28 mole %, or from 15 mole % to 28 mole %, or from 16 mole % to 28 mole %, or from 17 mole % to 28 mole %, or from 18 mole % to 28 mole %, or from 19 mole % to 28 mole %, or from 20 mole % to 28 mole %, or from 21 mole % to 28 mole %, or from 22 mole % to 28 mole %, or from 23 mole % to 28 mole %, or from 24 mole % to 28 mole %, or from 25 mole % to 28 mole %, or from 26 mole % to 28 mole %, or from 27 mole % to 28 mole %, wherein the above mole percentages of the polyol are based on the total moles of (a), (b) and (c), and further with the understanding that the remainder mole %, if any, of the polyol (c) is at least one other polyol other than TMP. Desirably, the polyol comprises residues of from 25% to 100% 1,1,1-trimethylolpropane, or from 30% to 100%, or from 35% to 100%, or from 40% to 100%, or from 45% to 100%, or from 50% to 100%, or from 55% to 100%, or from 60% to 100%, or from 65% to 100%, or from 70% to 100%, or from 75% to 100%, or from 80% to 100%, or from 85% to 100%, or from 90% to 100%. Although not to be bound by any theory, it is believed that the amount of polyol residues relative to the amount of residues from (a) and (b) in the curable aliphatic polyester is important in that when the mole % of (c) exceeds the mole % of (a) the monocoat coating described hereinbelow becomes brittle and if the amount of (c) is too little, then the monocoat coating described hereinbelow does not exhibit sufficient cross-linking resulting in excessive cure times, excessive cure temperatures and reduced chemical resistance.

The residues of the alicyclic diacid compound (d) are obtained from a cyclic aliphatic dicarboxylic acid compound, its diester derivative, its anhydride, or a combination thereof. Suitable alicyclic diacid compounds include compounds having two carboxylic acid groups, their diester derivatives, and their anhydrides. The dicarboxylic acid compounds are capable of forming ester linkages with diol or polyol compounds. For example, a polyester can be synthesized by using a polyhydroxyl compound and a derivative of a dicarboxylic acid such as, for example, dimethyl ester or other dialkyl esters of the diacid, or diacid chloride or other diacid halides, or acid anhydride. Suitable alicyclic diacids include, but are not limited to, hexahydrophthalic anhydride (HHPA), tetrahydrophthalic anhydride, tetrachlorophthalic anhydride, 5-norbornene-2,3-dicarboxylic anhydride, 5-norbornene-2,3-dicarboxylic acid, 2,3-norbornanedicarboxylic acid, 2,3-norbornanedicarboxylic acid anhydride, and mixtures thereof.

The acyclic aliphatic diacid (e) is a residue from open-chain aliphatic dicarboxylic acid compound, its diester derivative, its anhydride, or a combination thereof. Examples of acyclic aliphatic diacids include adipic acid, maleic anhydride, maleic acid, fumaric acid, itaconic anhydride, itaconic acid, citraconic anhydride, citraconic acid, dodecanedioic acid, succinic acid, succinic anhydride, glutaric acid, sebacic acid, azelaic acid, and mixtures thereof.

The alicyclic diacid (d) residue is present in an amount of 60 to 90 mole % and the acyclic aliphatic diacid (e) is in an amount of 10 to 40 mole %, wherein the mole percentages of (d) and (e) are based on the total moles of the diacids, (d) and (e). Alternatively, the alicyclic diacid (d) can be from 62 to 90 mole %, or from 64 to 90 mole %, or from 66 to 90 mole %, or from 68 to 90 mole % or from 70 to 90 mole %, or from 72 to 90 mole %, or from 74 to 90 mole %, or from 76 to 90 mole %, or from 78 to 90 mole %, or from 80 to 90 mole %, or from 82 to 90 mole %, or from 84 to 90 mole %, or from 86 to 90 mole %, or from 62 to 88 mole %, or from 64 to 88 mole %, or from 66 to 88 mole %, or from 68 to 88 mole % or from 70 to 88 mole %, or from 72 to 88 mole %, or from 74 to 88 mole %, or from 76 to 88 mole %, or from 78 to 88 mole %, or from 80 to 88 mole %, or from 82 to 88 mole %, or from 84 to 88 mole %, or from 86 to 88 mole %, or from 64 to 86 mole %, or from 66 to 86 mole %, or from 68 to 86 mole % or from 70 to 86 mole %, or from 72 to 86 mole %, or from 74 to 86 mole %, or from 76 to 86 mole %, or from 78 to 86 mole %, or from 80 to 86 mole %, or from 82 to 86 mole %, or from 84 to 86 mole %, or from 64 to 84 mole %, or from 66 to 84 mole %, or from 68 to 84 mole % or from 70 to 84 mole %, or from 72 to 84 mole %, or from 74 to 84 mole %, or from 76 to 84 mole %, or from 78 to 84 mole %, or from 80 to 84 mole %, or from 82 to 84 mole %, or from 64 to 82 mole %, or from 66 to 82 mole %, or from 68 to 82 mole % or from 70 to 82 mole %, or from 72 to 82 mole %, or from 74 to 82 mole %, or from 76 to 82 mole %, or from 78 to 82 mole %, or from 64 to 80 mole %, or from 66 to 80 mole %, or from 68 to 80 mole % or from 70 to 80 mole %, or from 72 to 80 mole %, or from 74 to 80 mole %, or from 76 to 80 mole %, or from 64 to 78 mole %, or from 66 to 78 mole %, or from 68 to 78 mole % or from 70 to 78 mole %, or from 72 to 78 mole %, or from 74 to 78 mole %. In all of the above ranges the remainder mole percent of the diacid comprising the curable, aliphatic polyester is the acyclic aliphatic diacid (e), wherein the molar sum of (d) and (e) is 100%.

It is further contemplated that the acid component comprise 60 to 70 mole %, or from 62 to 67 mole % of the residues of at least one alicyclic diacid comprising an anhydride and 30 to 40 mole % residues of an acyclic aliphatic diacid comprising adipic acid, succinic acid, glutaric acid and mixtures thereof, wherein the sum of (d) and (e) is 100 mole %.

Although not to be bound by any theory, it is believed that the amount of the alicyclic diacid is important because too much of (d) and the monocoat coating described hereinbelow becomes brittle, the coating becomes soft, weatherability is lowered and humidity resistance is reduced. Alternatively, too much of the acyclic aliphatic diacid (e) results in the converse of too little of (d).

In addition to the residues of alicyclic and cyclic aliphatic dicarboxylic acids described above, the diacid residues may further comprise from 0 to 10 mole percent of the residues of at least one monocarboxylic acid, a polybasic acid containing more that 2 carboxylic acid groups and/or an aromatic dicarboxylic acid. Non-limiting examples of such acids include benzoic acid, acetic acid, 2-ethylhexanoic acid, propionic acid, tert-butyl benzoic acid, and butanoic acid, trimellitic anhydride, phthalic acid, terephthalic acid, isophthalic acid, 2,6-naphthalenedicarboxylic acid, 1,3,4-butanetricarboxylic acid, 1,2,5-hexanetricarboxylic acid, and combinations thereof. Accordingly, the curable polyester contains at least 90 mole % of aliphatic diacid residues, based on the total moles of diacid residues.

The curable, aliphatic polyester of this invention has a hydroxyl number of 50 to 450 mg KOH/g resin. Further examples of hydroxyl number are 50 to 200, or 80 to 200, or 100 to 200, or from 80 to 150, or 100 to 150. In addition, the curable, aliphatic polyester has an acid number of 0 to 80 mg KOH/g polyester, or 0 to 15, or 0 to 10, or 2 to 25 mg KOH/g polyester, or is less than 20, or is 5 to 15 mg KOH/g polyester, or 8 to 12 mg KOH/g polyester.

The number average molecular weight (Mn) of the curable, aliphatic polyester is 300 g/mole to 10,000 g/mole, or 800 to 6000 g/mole, or 500 to 5000 g/mole. The curable, aliphatic polyester has a number average molecular weight (Mn) of from 1,000 g/mole, or 1,500 to 6,000 g/mole, or from 2,000 to 4,000 g/mole. Molecular weights are measured by gel permeation chromatography (GPC) using polystyrene equivalent molecular weight.

The glass transition temperature (abbreviated herein as "Tg") of the curable, aliphatic polyester is from −10° C. to 15° C. Alternatively, some additional, representative examples of Tg ranges for the curable, aliphatic polyester are −5 to 15° C., or −5 to 10° C. It is contemplated that the curable, aliphatic polyester can have a hydroxyl number of 50 to 250 mg potassium hydroxide per gram of polyester, an acid number of 2 to 15 mg potassium hydroxide per gram of polyester, and a number average molecular weight of 700 to 7000 g/mole, and a Tg of −10 to 15° C.

The curable, aliphatic polyester can be prepared by heating the reactants until the desired molecular weight, acid number, or hydroxyl number is reached. The reaction can be monitored by the collection of water (when diacids are used as starting materials) or alcohol (when diesters are used). The polyester typically can be prepared at a temperature range of 150 to 250° C. and at atmospheric pressure or under vacuum. In one embodiment, for example, the diacid component and diols used to make the polyester may be partially reacted before the polyol is added. Once the polyol is added to the reaction mixture, heating is continued until a target acid number is satisfied.

Alternatively, the curable, aliphatic polyester can be prepared in the presence of a process solvent to help remove the water or alcohol by-products of the reaction and to promote the synthesis of the polyester resin. The process solvent may be any solvent known in the art as useful for the preparation of polyester polymers. For example, the process solvent can be a hydrocarbon solvent. In another example, the process solvent can comprise an aromatic hydrocarbon such as, for example, xylene. The xylene can be a pure isomer, or a mixture of ortho, mew, and para isomers. The amount of process solvent may be determined by routine experimentation as understood by those skilled in the art. The process solvent can be added in amounts ranging from 0.5 to 5 weight percent, based on the total weight of reaction mixture.

Optionally, a catalyst may be used to promote the synthesis of the polyester. The catalyst may be any catalyst known in the art to be useful for the formation of polyester resins. For example, the catalyst can be a tin catalyst, such as, for example, FASCAT™ 4100 (available from PMC Organometallix). The catalyst increases the rate of the polyester resin reaction, as described above, and its amount may be determined by routine experimentation as understood by those skilled in the art. Ordinarily, the catalyst is added in amounts ranging from 0.01 to 1.00 weight percent based on the total weight of the reactants.

A Thermosetting Coating Solution

Another aspect of the present invention is for a thermosetting coating solution comprising:

A. 50 to 90 weight percent, based on the total weight of (A) and (B) of at least one curable, aliphatic polyester, comprising residues of:

i. hydroxyl component comprising the residues of:
    a. from 5 to 45 mole %, based on the total moles of (a) and (b), of 2,2,4,4-tetraalkylcyclobutane-1,3-diol (TACD);
    b. from 55 to 95 mole % based on the total moles of (a) and (b), of a diol other than TACD; and
    c. from 3 to 35 mole %, based on the total moles of (a), (b) and (c), of a polyol;
  ii. a diacid component comprising the residues of:
    d. from 60 to 90 mole %, based on the total moles of the diacids (d) and (e), of an alicyclic diacid; and
    e. from 10 to 40 mole %, based on the total moles of the diacids (d) and (e), of an acyclic aliphatic diacid;
  wherein the curable polyester contains diacid residues in an amount of at least 90 mole % of aliphatic diacid residues, based on the total moles of all diacid residues in the curable polyester, and, wherein the curable polyester has a hydroxyl number of 50 to 450 mgKOH/g of polyester, an acid number of 0 to 80 mgKOH/g, and a number average molecular weight of 300 to 10,000 g/mole of polyester; and B. from 10 to 50 weight percent, based on the total weight of the solution, of a solvent other than water.

Advantageously, the thermosetting coating solution has less than 1 weight % of undissolved solids at 25° C. Regarding the curable, aliphatic polyester in the coating solution, the curable, aliphatic polyester component (A) of the coating solution may include any combination of the various embodiments of diacids, diols, polyols, alicyclic and acyclic aliphatic diacids, hydroxyl numbers, and glass transition temperatures described above in accordance with the curable aliphatic polyester of the present invention.

The thermosetting coating solution also comprises 10 to 50 weight percent, based on the total weight of components (A) and (B), of a solvent other than water. Examples of solvents include, but are not limited to, benzene, xylene, mineral spirits, naphtha, toluene, acetone, methyl ethyl ketone, methyl n-amyl ketone, methyl isoamyl ketone, n-butyl acetate, isobutyl acetate, t-butyl acetate, n-propyl acetate, isopropyl acetate, ethyl acetate, methyl acetate, ethanol, n-propanol, isopropanol, n-butanol, sec-butanol, isobutanol, ethylene glycol monobutyl ether, propylene glycol n-butyl ether, propylene glycol methyl ether, propylene glycol monopropyl ether, dipropylene glycol methyl ether, diethylene glycol monobutyl ether, trimethylpentanediol monoisobutyrate, ethylene glycol mono-octyl ether, diacetone alcohol, 2,2,4-trimethyl-1,3-pentanediol monoisobutyrate (available commercially from Eastman Chemical Co. under the trademark TEXANOL™), Aromatic 100, Aromatic 150, and combinations thereof. The coating composition may also comprise reactive solvents such as, for example, diallyl phthalate, SANTOLINK™ XI-100 polyglycidyl allyl ether (available from Cytec), and others as described, for example, in U.S. Pat. Nos. 5,349,026 and 5,371,148. Alternatively, the thermosetting coating solution can have from 15 weight % to 50 weight %, or from 25 weight % to 50 weight %, or at from 30 weight % to 50 weight %, or from 35 weight % to 50 weight %, or from 40 weight % to 50 weight %, or from 45 weight % to 50 weight % solvent, wherein the amount of solvent is based on the weight of components (A) and (B), in the coating solution. Desirably, the solvent includes less than 3 weight % water, or less than 2 weight % water, or less than 1 weight % water, based on the weight of the thermosetting coating solution. More desirably, the solvent contains no detectable water as determined using analytical procedures known to those skilled in the art for detecting the presence of water in an organic solvent. Alternatively, the solvent is selected from xylene, methyl n-amyl ketone, n-butyl acetate, Aromatic 100, Aromatic 150 and combinations thereof.

In one aspect the curable polyester resin in the coating solution of the present invention is essentially free of aromatic diacid residues (e.g. less than 1 mole % based on the total acid component); the TACD comprises 2,2,4,4-tetramethyl-1,3-cyclobutanediol; the diol (b) is selected from the group consisting of 2,2-dimethyl-1,3-propanediol (neopentyl glycol), 1,2-cyclohexanedimethanol, 1,3-cyclohexanedimethanol, 1,4-cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 1,4-butanediol, and 1,6-hexanediol, ethylene glycol, propylene glycol, diethylene glycol, dipropylene glycol, triethylene glycol, tetraethylene glycol, polyethylene glycol and mixtures thereof; the diol (b) includes at least 15 mole % neopentyl glycol, based on the total moles of (b); the molar ratio of (b):(a) is from 1.3:1 to 2.5:1, or can be from 1.5:1 to 2.0:1, or can be from 1.1:1 to 1.8:1; the polyol (c) is one or more polyols selected from the group consisting of 1,1,1-trimethylolpropane (TMP), 1,1,1-trimethylolethane, glycerin, and pentaerythritol; the alicyclic diacid (iv) is selected from the group consisting of hexahydrophthalic anhydride (HHPA), tetrahydrophthalic anhydride, tetrachlorophthalic anhydride, 5-norbornene-2,3-dicarboxylic anhydride, 5-norbornene-2,3-dicarboxylic acid, 2,3-norbornanedicarboxylic acid, 2,3-norbornanedicarboxylic acid anhydride, and mixtures thereof; the alicyclic diacid (d) comprises hexahydrophthalic anhydride; the acyclic aliphatic diacid (e) is selected from the group consisting of adipic acid, maleic anhydride, maleic acid, fumaric acid, itaconic anhydride, itaconic acid, citraconic anhydride, succinic acid, succinic anhydride, glutaric acid, citraconic acid, dodecanedioic acid, sebacic acid, azelaic acid, and mixtures thereof; the residues of the acyclic aliphatic diacid (e) are obtained from compounds such as adipic acid; (a) comprises from 30 to 40 mole % 2,2,4,4-tetramethyl-1,3-cyclobutanediol and (b) comprises from 60 to 70 mole % of a diol selected from the group consisting of 2,2-dimethyl-1,3-propanediol, 1,2-cyclohexanedimethanol, 1,3-cyclohexanedimethanol, 1,4-cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 1,4-butanediol, 1,6-hexanediol and mixtures thereof, wherein the mole % is based on the total moles of (a) and (b); the acid component comprises 60 to 70 mole % of the residues of at least one alicyclic diacid comprising an anhydride and 30 to 40 mole % residues of an acyclic aliphatic diacid comprising adipic acid, succinic acid, glutaric acid and mixtures thereof; comprising 20 to 30 mole % residues of (c), based on the total moles of the (a), (b), and (c); comprises from 62 to 67 mole % residues of (d), based on based on the total moles of the diacids (d) and (e); the curable polyester has an acid number of less than 20 mgKOH/g of polyester; and the curable polyester has a hydroxyl number of 100 to 200 mgKOH/g of polyester and the acid number is from 5 to 15 mgKOH/g of polyester.

Thermosetting Monocoat Coating

Another aspect of the present invention is for a thermosetting monocoat coating composition, comprising:

A. 50 to 90 weight percent, based on the total weight of (A) and (C), of at least one curable, aliphatic polyester, comprising residues of:

i. hydroxyl component comprising the residues of:
    a. from 5 to 45 mole %, based on the total moles of (a) and (b), of 2,2,4,4-tetraalkylcyclobutane-1,3-diol (TACD);
    b. from 55 to 95 mole % based on the total moles of (a) and (b), of a diol other than TACD; and
    c. from 3 to 35 mole %, based on the total moles of (a), (b) and (c), of a polyol;
  ii. a diacid component comprising the residues of:
    d. from 60 to 90 mole %, based on the total moles of the diacids (d) and (e), of an alicyclic diacid; and
    e. from 10 to 40 mole %, based on the total moles of the diacids (d) and (e), of an acyclic aliphatic diacid;
  wherein the curable polyester contains diacid residues in an amount of at least 90 mole % of aliphatic diacid residues, based on the total moles of all diacid residues in the curable polyester, and, wherein the curable polyester has a hydroxyl number of 50 to 450 mgKOH/g of polyester, an acid number of 0 to 80 mgKOH/g, and a number average molecular weight of 300 to 10,000 g/mole of polyester; and B. from 10 to 50 weight percent, based on the total weight of the coating composition, of a solvent other than water; and C. from 10 to 50 weight percent, based on the total weight of (A) and (C), comprising at least one compound reactive with a carboxylic acid or a hydroxyl group.

It is understood that the curable, aliphatic polyester component (A) of the coating composition may include any combination of the various embodiments of diacids, diols, polyols, acid and hydroxyl numbers, and glass transition temperatures described hereinabove in accordance with the present invention, and in incorporated into the description of the monocoat coating composition by reference. Thus, in one aspect the curable, aliphatic polyester in the thermosetting monocoat coating of the present invention: is essentially free of aromatic diacid residues (e.g. less than 1 mole % based on the total acid component); the TACD comprises 2,2,4,4-tetramethyl-1,3-cyclobutanediol; the diol (b) is selected from the group consisting of 2,2-dimethyl-1,3-propanediol (neopentyl glycol), 1,2-cyclohexanedimethanol, 1,3-cyclohexanedimethanol, 1,4-cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 1,4-butanediol, and 1,6-hexanediol, ethylene glycol, propylene glycol, diethylene glycol, dipropylene glycol, triethylene glycol, tetraethylene glycol, polyethylene glycol and mixtures thereof; the diol (b) includes at least 15 mole % neopentyl glycol, based on the total moles of (b); the molar ratio of (b):(a) is from 1.3:1 to 2.5:1, or can be from 1.5:1 to 2.0:1, or can be from 1.1:1 to 1.8:1; the polyol (c) is one or more polyols selected from the group consisting of 1,1,1-trimethylolpropane (TMP), 1,1,1-trimethylolethane, glycerin, and pentaerythritol; the alicyclic diacid (iv) is selected from the group consisting of hexahydrophthalic anhydride (HHPA), tetrahydrophthalic anhydride, tetrachlorophthalic anhydride, 5-norbornene-2,3-dicarboxylic anhydride, 5-norbornene-2,3-dicarboxylic acid, 2,3-norbornanedicarboxylic acid, 2,3-norbornanedicarboxylic acid anhydride, and mixtures thereof; the alicyclic diacid (d) comprises hexahydrophthalic anhydride; the acyclic aliphatic diacid (e) is selected from the group consisting of adipic acid, maleic anhydride, maleic acid, fumaric acid, itaconic anhydride, itaconic acid, citraconic anhydride, citraconic acid, dodecanedioic acid, sebacic acid, azelaic acid, and mixtures thereof; the residues of the acyclic aliphatic diacid (e) are obtained from compounds such as adipic acid; (a) comprises from 30 to 40 mole % 2,2,4,4-tetramethyl-1,3-cyclobutanediol and (b) comprises from 60 to 70 mole % of a diol selected from the group consisting of 2,2-dimethyl-1,3-propanediol, 1,2-cyclohexanedimethanol, 1,3-cyclohexanedimethanol, 1,4-cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 1,4-butanediol, 1,6-hexanediol and mixtures thereof, wherein the mole % is based on the total moles of (a) and (b); the acid component comprises 60 to 70 mole % of the residues of at least one alicyclic diacid comprising an anhydride and 30 to 40 mole % residues of an acyclic aliphatic diacid comprising adipic acid, succinic acid, glutaric acid and mixtures thereof; comprising 20 to 30 mole % residues of (c), based on the total moles of the (a), (b), and (c); comprises from 62 to 67 mole % residues of (d), based on based on the total moles of the diacids (d) and (e); the curable polyester has an acid number of less than 20 mgKOH/g of polyester; and the curable polyester has a hydroxyl number of 100 to 200 mgKOH/g of polyester and the acid number is from 5 to 15 mgKOH/g of polyester.

The curable, aliphatic polyester resin comprises a reactive functional group, typically a hydroxyl group or carboxyl group for the purpose of later reacting with a crosslinker in the thermosetting coating formulation. The functional group is controlled by having either excess diol or acid (from dicarboxylic acid or tricarboxylic acid) in the polyester resin composition. The desired crosslinking pathway will determine whether the polyester resin will be hydroxyl-terminated or carboxylic acid-terminated. The concept is known to those skilled in the art and described in *Organic Coatings Science and Technology,* 2nd ed., p. 246-257, by Z. Wicks, F. Jones, and S. Pappas, Wiley, New York, 1999, the disclosure of which is incorporated herein by reference.

Alternative, thermosetting monocoat coating composition can have from 60 to 85 weight %, or from 70 to 80 weight % of (A); and from 15 to 40 weight %, or from 20 to 30 weight % of the crosslinker (C), wherein the weight % of (A) and (C) are based on the total weight of the curable polyester (A) and the crosslinker (C).

Typically, the crosslinker will be a compound, generally known in the art, that can react with either the carboxylic acid-terminated or hydroxyl-terminated polyester resin. For example, the crosslinker can comprise at least one compound chosen from epoxides, melamines, hydroxy alkyl amides, and isocyanates. For example, epoxide crosslinkers will react with a carboxylic acid-terminated polyester resin, whereas melamines, isocyanates, and isocyanurates will react with a hydroxyl-terminated polyesters. Desirably, the crosslinker is an aminoplast or an isocyanate crosslinker.

The aminoplast crosslinker (or cross-linking agent) is preferably a melamine or "amino" crosslinker which are well-known in the art and can be used in the coating composition of the invention. Such melamine-formaldehyde type cross-linking agents, i.e., a cross-linking agent having a plurality of —N(CH$_2$OR$^3$)$_2$ functional groups, wherein R$^3$ is C$_1$-C$_4$ alkyl, and desirably is a methyl moiety.

The cross-linking agent may also be a modified melamine-formaldehyde type resin such as toluene sulfonamide modified melamine-formaldehyde resins, and the like. For example, the coating composition of the present invention can comprise at least one melamine compound chosen from hexamethoxymethylmelamine, tetramethoxymethylbenzoguanamine, tetramethoxymethylurea, mixed butoxy/methoxy substituted melamines and mixtures thereof. Some examples of commercially available melamine crosslinkers include the CYMEL™300 series and CYMEL™ 1100 series melamine crosslinkers, available from Cytec Surface Specialties. The polyester to melamine weight ratio is typically from 1 to 9, or from 1.5 to 6, or 2 to 4.

In addition to melamines, isocyanates and isocyanurates can be used as crosslinkers in accordance with the invention. Representative isocyanates and isocyanurates include, but are not limited to, toluene diisocyanate, isocyanurates of toluene diisocyanate, diphenylmethane 4,4'-diisocyanate, isocyanurates of 4,4'-diisocyanate, methylenebis-4,4'-isocyanatocyclohexane, isophorone diisocyanate, isocyanurates of isophorone diisocyanate, the biuret of 1,6-hexamethylene diisocyanate, 1,6-hexamethylene diisocyanate, isocyanurates of 1,6-hexamethylene diisocyanate, 1,4-cyclohexane diisocyanate, p-phenylene diisocyanate, and triphenylmethane 4,4',4"-triisocyanate, tetramethyl xylene diisocyanate, metaxylene diisocyanate, polyisocyanates, 1,4-butylene diisocyanate, methylene bis (4-cyclohexyl isocyanate), isophorone diisocyanate and isocyanate-terminated adducts of ethylene glycol, 1,4-butylene glycol, trimethylol propane, or combinations thereof. Desirably, the isocyanate is selected from 1,6-hexamethylene diisocyanate, methylene bis (4-cyclohexyl isocyanate), isophorone diisocyanate, 2,4-toluene diisocyanate, and Bayhydur® 302 (BAYER MaterialScience).

The coating composition also can comprise isocyanate-terminated adducts of diols and polyols as crosslinkers. These crosslinkers are formed by reacting more than one equivalent of a diisocyanate, such as those mentioned above, with one equivalent of a diol or polyol to form a higher molecular weight isocyanate prepolymer with a isocyanate functionality of 2 to 3. Some commercial examples of isocyanate-terminated adducts include isocyanate crosslinkers under the DESMODUR™ and MONDUR™ trademarks available from Bayer Material Science and under the TOLONATE™ trademark from Perstorp Corporation.

It may be desirable to utilize a one or more catalysts for promoting cross-linking. Representative crosslinking catalysts include carboxylic acids, sulfonic acids, tertiary amines, tertiary phosphines, tin compounds, or combinations of these compounds. Some specific examples of crosslinking catalysts include p-toluenesulfonic acid, the NACURE™ 155, 5076, and 1051 catalysts sold by King Industries, BYK 450, 470, available from BYK-Chemie U.S.A., methyl tolyl sulfonimide, dodecylbenzene sulfonic acid, dinonylnaphthalene sulfonic acid, and dinonylnaphthalene disulfonic acid, benzoic acid, triphenylphosphine, dibutyl¬tindilaurate, and dibutyltindiacetate.

The curable, aliphatic polyester can comprise hydroxyl-terminated end groups and the crosslinker can comprise an isocyanate. The coating composition also can comprise at least one isocyanate crosslinking catalyst such as, for example, FASCAT™ 4202 (dibutyltindilaurate), FASCAT™ 4200 (dibutyltindiacetate, both available from Arkema), DABCO™ T-12 (available from Air Products) and K-KAT™ 348, 4205, 5218, XC6212™ non-tin catalysts (available from King Industries), and tertiary amines.

Stoichiometric calculations for the curable, aliphatic polyester and isocyanate reaction are known to those skilled in the art and are described in *The Chemistry of Polyurethane Coatings*, Technical Publication, p. 20, by Bayer Material Science, 2005. Persons having ordinary skill in the art will understand that crosslinking between the polyester resin and isocyanate reaches maximum molecular weight and optimal properties associated with molecular weight at an isocyanate:hydroxyl equivalent ratio of 1:1; that is, when one equivalent of isocyanate (—NCO) reacts with one equivalent of hydroxyl (—OH). Typically, however, a small excess of isocyanate, for example, 5 to 10% above a 1:1 equivalent, is used to allow for the loss of isocyanate by the reaction with adventitious moisture from the atmosphere, solvents, and pigments. Other NCO:OH ratios can be used; for example, it may be desirable to vary the NCO to OH ratio to less than 1:1 to improve flexibility or greater than 1:1 to produce harder, more chemical resistant, and more weather resistant coatings.

For the present invention, the solvent borne, thermosetting coating composition has an NCO:OH ratio, on an equivalent basis, of 0.9:1.0 to 1.5:1.0. Examples of other NCO:OH ratios are 0.95:1.0 to 1.25:1.0 and 0.95:1.0 to 1.1:1.0.

The thermosetting coating composition also comprises 10 to 85 weight percent, based on the total weight of components (A), (B), and (C) of a solvent other than water. Examples of solvents include, but are not limited to, benzene, xylene, mineral spirits, naphtha, toluene, acetone, methyl ethyl ketone, methyl n-amyl ketone, methyl isoamyl ketone, n-butyl acetate, isobutyl acetate, t-butyl acetate, n-propyl acetate, isopropyl acetate, ethyl acetate, methyl acetate, ethanol, n-propanol, isopropanol, n-butanol, sec-butanol, isobutanol, ethylene glycol monobutyl ether, propylene glycol n-butyl ether, propylene glycol methyl ether, propylene glycol monopropyl ether, dipropylene glycol methyl ether, diethylene glycol monobutyl ether, trimethyl-pentanediol mono-isobutyrate, ethylene glycol mono-octyl ether, diacetone alcohol, 2,2,4-trimethyl-1,3-pentanediol monoisobutyrate (available commercially from Eastman Chemical Co. under the trademark TEXANOL™), or combinations thereof. The coating composition may also comprise reactive solvents such as, for example, diallyl phthalate, SANTOLINK™ XI-100 polyglycidyl allyl ether (available from Cytec), and others as described, for example, in U.S. Pat. Nos. 5,349,026 and 5,371,148. Alternatively, the thermosetting coating composition comprises from 5 weight % up to 20 weight %, or from 5 weight % up to 25 weight %, or from 5 weight % up to 30 weight %, or from 5 weight % up to 35 weight %, or from 5 weight % up to 40 weight %, or from 5 weight % up to 45 weight %, or from 5 weight % up to 50 weight % of a solvent, based on the weight of components (A), (B), and (C) in the coating composition.

In another example, the thermosetting coating composition can comprise 25 to 35 weight percent solvent, 20 to 35 weight percent of a melamine crosslinker, and a crosslinking catalyst comprising p-toluenesulfonic acid. In another aspect, the thermosetting coating composition comprises 25 to 35 weight percent solvent and 20 to 35 weight percent hexamethoxy-methylmelamine.

The coating composition of the instant invention may further contain at least one coating additive known in the art. Examples of coating additives include, but are not limited to, leveling, rheology and flow control agents such as silicones, fluorocarbons or cellulosics; extenders; plasticizers; flatting agents; pigment wetting and dispersing agents; ultraviolet (UV) absorbers; UV light stabilizers; defoaming and antifoaming agents; anti-settling, anti-sag and bodying agents; anti-skinning agents; anti-flooding and anti-floating agents; and corrosion inhibitors. Specific examples of such additives can be found in the *Raw Material Index and Buyer's Guide*, published by the National Paint & Coatings Association, 1500 Rhode Island Avenue, N.W., Washington., D.C. 20005. Further examples of such additives may be found in U.S. Pat. No. 5,371,148.

Examples of flatting agents include, but are not limited to, synthetic silica, available from the Davison Chemical Division of W. R. Grace & Company as SYLOID™; polypropylene, available from Hercules Inc., as HERCOFLAT™; and synthetic silicate, available from J. M. Huber Corporation, as ZEOLEX™.

Examples of dispersing agents include, but are not limited to, sodium bis(tridecyl) sulfosuccinate, di(2-ethyl hexyl) sodium sulfosuccinate, sodium dihexylsulfosuccinate, sodium dicyclohexyl sulfosuccinate, diamyl sodium sulfosuccinate, sodium dusobutyl sulfosuccinate, disodium isodecyl sulfosuccinate, disodium ethoxylated alcohol half ester of sulfosuccinic acid, disodium alkyl amido polyethoxy sulfosuccinate, tetra-sodium N-(1,2-dicarboxyethyl)-N-octadecyl sulfosuccinamate, disodium N-octasulfosuccinamate, sulfated ethoxylated nonylphenol, 2-amino-2-methyl-1-propanol, and the like.

Examples of viscosity, suspension, and flow control agents include, but are not limited to, polyaminoamide phosphate, high molecular weight carboxylic acid salts of polyamine amides, and alkylene amine salts of an unsaturated fatty acid, all available from BYK Chemie USA as ANTI TERRA™. Further examples include, but are not limited to, polysiloxane copolymers, polyacrylate solution, cellulose esters, hydroxyethyl cellulose, hydroxypropyl cellulose, polyamide wax, polyolefin wax, hydroxypropyl methyl cellulose, polyethylene oxide, and the like.

Several proprietary antifoaming agents are commercially available and include, but are not limited to, BUBREAK™, available from Buckman Laboratories Inc., BYK™, available from BYK Chemie, U.S.A., FOAMASTER™ and NOPCO™ available from Henkel Corp./Coating Chemicals, DREWPLUS™, available from the Drew Industrial Division of Ashland Chemical Company, TROYSOL™ and TROYKYD™, available from Troy Chemical Corporation, and SAG™, available from Union Carbide Corporation.

Examples of UV absorbers, UV light stabilizers, and antioxidants include, but are not limited to, substituted benzophenone, substituted benzotriazoles, hindered amines, hindered benzoates, phenols, and phosphites, some of which are available from Cytec Specialty Chemicals as CYASORB® UV, and from Ciba Specialty Chemicals as TINUVIN®, CHIMASSORB®, IRGANOX® and IRGAFOS®; diethyl-3-acetyl-4-hydroxy-benzyl-phosphonate, 4-dodecyloxy-2-hydroxy benzophenone, and resorcinol monobenzoate. For example, in one embodiment, the thermosetting coating composition can contain IRGANOX® 1010 antioxidant, available from Ciba Specialty Chemicals.

Such paint or coating additives as described above form a relatively minor proportion of the coating composition, generally 0.05 weight percent to 5.00 weight percent. For example, a coating composition optionally may contain at least one of the above-described additives and at least one pigment.

The solvent borne thermosetting coating composition, as described above, also may comprise at least one pigment. Typically, the pigment is present in an amount of 20 to 60 weight percent, based on the total weight of the coating composition. Examples of pigments include those generally recognized by persons of ordinary skill in the art of surface coatings. For example, the pigment may be a typical organic or inorganic pigment, especially those set forth by the *Colour Index*, 3rd ed., 2nd Rev., 1982, published by the Society of Dyers and Colourists in association with the American Association of Textile Chemists and Colorists. Other examples of suitable pigments include, but are not limited to, titanium dioxide, barytes, clay, calcium carbonate, CI Pigment White 6 (titanium dioxide), CI Pigment Red 101 (red iron oxide), CI Pigment Yellow 42, CI Pigment Blue 15, 15:1, 15:2, 15:3, 15:4 (copper phthalocyanines); CI Pigment Red 49:1 and CI Pigment Red 57:1. Colorants such as, for example, phthalocyanine blue, molybdate orange, or carbon black also may be added to the coating composition. For example, the solvent borne, thermosetting coating formulations can contain titanium dioxide as the pigment.

The thermosetting coating composition of this invention may optionally comprise a thermosetting acrylic ("TSA") resins. Such TSA resins are typically prepared by free radical polymerization in bulk or in a solvent. Initiators are of the free radical type and are usually organic peroxides or azo compounds, such as benzoyl peroxide, t-butyl hydroperoxide, t-butyl peroxide, t-butyl peroxybenzoate, azobisisobutyronitrile, and 2,2'-azobis(2,4-dimethyl)-valeronitrile. The reaction is preferably carried out at the reflux temperature of the solvent used, which is generally higher than the thermal decomposition temperature of the initiator employed. The acrylic resin is composed of ethylenically unsaturated monomers that include acrylate, methacrylate, styrene, (meth) acrylic acid, and vinyl esters. They further contain hydroxyl, epoxy, carboxyl, blocked-phenol and/or acetoacetoxy functional groups. Suitable examples of preparation methods and components of the acrylic resin include those known in the art including, but not limited to, those described above, and in *Resins for Surface Coatings*, Vol. II, p. 121-210, ed. by P. K. T. Oldring and G Hayward, SITA Technology, London, U K, 1987.

Examples of hydroxyl functional TSA resins include the MACRYNAL™ series, available from Cytec Surface Specialties; the ACRYLOID™ series, available from Rohm and Haas; and the JONCRYL™ series, available from BASF Corporation. One specific example of a hydroxyl functional TSA resin used is MACRYNAL™ SM 515/70BAC, available from Cytec Surface Specialties.

The curable, aliphatic polyester and the TSA resin can be blended together. The weight percent of polyester in the blend is 5 to 50 weight %, or can be from 10 to 40 weight percent, or may be from 15 to 30 weight percent.

Typically, the thermosetting coating composition and additives can be formulated into coating that contains 40 to 90% non-volatiles. After formulation, the coating composition can be applied to a substrate or article using method and techniques known to those skilled in the coating art.

Thus, in accordance with another aspect of the invention is a shaped or formed article that has been coated with the coating compositions of the present invention. The substrate can be any common substrate such as paper; polymer films such as polyethylene or polypropylene; wood; metals such as aluminum, steel or galvanized sheeting; glass; urethane elastomers; primed (painted) substrates; and the like. In one aspect, the substrate is a metal, such as iron or aluminum, that has been coated with the monocoat coating composition described herein, heated to a predetermined temperature and for a predetermined amount of time to produce a cured thermosetting coating on the substrate. In one aspect, the metal is at least one surface of an automobile. The cured coating has an impact resistance of greater than 35 in.-lb as determined in accordance with ASTM D 2794. The cured coating can also have an impact resistance of from 36 to 200 in.-lb, or from 50 to 200 in.-lb or from 60 to 200 in.-lb, or from 50 to 150 in.-lb, or from 60 to 125 in.-lb, as determined in accordance with ASTM D 2794.

The cured coating has a gloss retention after abrasion, based on ASTM D 6279, of greater than 50%, or greater than 55%, or greater than 60%, or greater than 70%. Additionally, the cured coating has a gloss retention on exposure to artificial weather, based on SAE J2527, of greater than 85% after 1000 hours, or greater than 85% after 1500 hours, or greater than 85% after 2000 hours, or greater than 85% after 2500 hours, or greater than 85% after 3000 hours, or greater than 85% after 3500 hours, or greater than 85% after 4000 hours.

The coating composition can be coated onto a substrate using techniques known in the art. Accordingly, another aspect of the present invention is a method for applying a thermosetting monocoat coating composition to an article or substrate. The method includes the steps of:

I. providing a suitable substrate for coating;
II. providing a thermosetting monocoat coating composition comprising:
   A. 50 to 90 weight percent, based on the total weight of (A) and (C), of at least one curable, aliphatic polyester, comprising residues of:
      i. hydroxyl component comprising the residues of:
         a. from 5 to 45 mole %, based on the total moles of (a) and (b), of 2,2,4,4-tetraalkylcyclobutane-1,3-diol (TACD);
         b. from 55 to 95 mole % based on the total moles of (a) and (b), of a diol other than TACD; and
         c. from 3 to 35 mole %, based on the total moles of (a), (b) and (c), of a polyol;
      ii. a diacid component comprising the residues of:
         d. from 60 to 90 mole %, based on the total moles of the diacids (d) and (e), of an alicyclic diacid; and
         e. from 10 to 40 mole %, based on the total moles of the diacids (d) and (e), of an acyclic aliphatic diacid;
   wherein the curable polyester contains diacid residues in an amount of at least 90 mole % of aliphatic diacid residues, based on the total moles of all diacid residues in the curable polyester, and, wherein the curable polyester has a hydroxyl number of 50 to 450 mgKOH/g of polyester, an acid number of 0 to 80 mgKOH/g, and a number average molecular weight of 300 to 10,000 g/mole of polyester;
   B. from 10 to 50 weight percent, based on the total weight of the coating composition, of a solvent other than water; and
   C. from 10 to 50 weight percent, based on the total weight of (A) and (C), of a crosslinker comprising an aminoplast and/or isocyanate;
III. applying the thermosetting monocoat coating composition to the substrate to produce a coated substrate; and
IV. applying heat to the coated substrate to a predetermined temperature and for a predetermined time to produce a cured thermosetting coating.

As previously noted, the substrate can be paper; polymer films such as polyethylene or polypropylene; wood; metals such as aluminum, steel or galvanized sheeting; glass; urethane elastomers; primed (painted) substrates; and the like.

The thermosetting monocoat coating composition is as described above, the disclosure of which is incorporated into this aspect of the invention by reference. The thermosetting monocoat coating composition can be applied to substrate using techniques known to those skilled in the art. For example, the thermosetting monocoat coating composition can be applied by brush application, spraying, draw-down, roll-coating, to a thickness of 0.5 to 4 mils of wet coating onto the substrate. Methods for spraying the monocoat coating composition onto the substrate include high volume low pressure (HVLP), low volume low pressure (LVLP), rotational bell or rotary atomizer; hot spray, airless spraying and air assisted airless spraying systems.

The coating can be cured at ambient (room) temperature or heated in a forced air oven to a temperature of 35° C. to 400° C., or 50° C. to 200° C., or 60° C. to 175° C., or 80° C. to 175° C., or 50° C. to 175° C., for a period of from 5 seconds to 5 hours. The time necessary to cure the coating at the aforementioned temperatures can be from 5 minutes to 5 hours, or from 10 minutes to 4 hours; or from 20 minutes to 3 hours, or from 30 minutes to 1 hour. However, it is also contemplated that the cure time will be from 5 minutes to 90 minutes. The cured coating on the substrate is then allowed to cool. Further examples of typical application and curing methods can be found in U.S. Pat. Nos. 4,737,551 and 4,698,391 and 3,345,313.

The invention is also further described in the following description of groupings. The embodiments that are useful in any of the above embodiments, as stated below, is with reference to the embodiments within its grouping.

Group 1

In a first embodiment, there is provided a curable, aliphatic polyester comprising residues of:
 i. a hydroxyl component, said hydroxyl component comprising the residues of:
  a. from 5 to 45 mole %, based on the total moles of (a) and (b), of 2,2,4,4-tetraalkylcyclobutane-1,3-diol (TACD);
  b. from 55 to 95 mole % based on the total moles of (a) and (b), of a diol other than TACD; and
  c. from 3 to 35 mole %, based on the total moles of (a), (b) and (c), of a polyol;
 ii. a diacid component, said diacid component comprising the residues of:
  d. from 60 to 90 mole %, based on the total moles of the diacids of an alicyclic diacid; and
  e. from 10 to 40 mole %, based on the total moles of the diacids an acyclic aliphatic diacid;
  wherein the curable polyester contains diacid residues in an amount of at least 90 mole % of aliphatic diacid residues, based on the total moles of all diacid residues in the curable polyester, and, wherein the curable polyester has a hydroxyl number of 50 to 450 mgKOH/g of polyester, an acid number of 0 to 80 mgKOH/g, and a number average molecular weight of 300 to 10,000 g/mole of polyester.

In another embodiment, the diacid can be essentially free of aromatic diacid residues.

In any of the above embodiments, the TACD comprises 2,2,4,4-tetramethyl-1,3-cyclobutanediol.

In any of the above embodiments, the diol (b) is selected from the group consisting of 2,2-dimethyl-1,3-propanediol (neopentyl glycol), 1,2-cyclohexanedimethanol, 1,3-cyclohexanedimethanol, 1,4-cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 1,4-butanediol, and 1,6-hexanediol, ethylene glycol, propylene glycol, diethylene glycol, dipropylene glycol, triethylene glycol, tetraethylene glycol, polyethylene glycol and mixtures thereof.

In any of the above embodiments, the diol (b) is selected from the group consisting of 2,2-dimethyl-1,3-propanediol (neopentyl glycol), 1,2-cyclohexanedimethanol, 1,3-cyclohexanedimethanol, 1,4-cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 1,4-butanediol, 1,6-hexanediol and mixtures thereof.

In any of the above embodiments, at least 15 mole % of the diol (b) residues is neopentyl glycol based on the total moles of diol (b).

In any of the above embodiments, the molar ratio of (b):(a) is from 1.3:1 to 2.5:1.

In any of the above embodiments, the molar ratio of (b):(a) is from 1.5:1 to 2.0:1.

In any of the above embodiments, the molar ratio of (b):(a) is from 1.1:1 to 1.8:1.

In any of the above embodiments, the polyol (c) is one or more selected from the group consisting of 1,1,1-trimethylolpropane (TMP), 1,1,1-trimethylolethane, glycerin, and pentaerythritol.

In any of the above embodiments, the alicyclic diacid (d) is selected from the group consisting of hexahydrophthalic anhydride (HHPA), tetrahydrophthalic anhydride, tetrachlorophthalic anhydride, 5-norbornene-2,3-dicarboxylic anhydride, 5-norbornene-2,3-dicarboxylic acid, 2,3-norbornanedicarboxylic acid, 2,3-norbornanedicarboxylic acid anhydride, and mixtures thereof.

In any of the above embodiments, the curable polyester of claim 1, wherein the alicyclic diacid (d) comprises hexahydrophthalic anhydride.

In any of the above embodiments, the acyclic aliphatic diacid (e) is selected from the group consisting of adipic acid, maleic anhydride, maleic acid, fumaric acid, itaconic anhydride, succinic acid, succinic anhydride, glutaric acid, itaconic acid, citraconic anhydride, citraconic acid, dodecanedioic acid, sebacic acid, azelaic acid, and mixtures thereof.

In any of the above embodiments, the acyclic aliphatic diacid (e) comprises adipic acid.

In any of the above embodiments, (a) comprises from 30 to 40 mole % 2,2,4,4-tetramethyl-1,3-cyclobutanediol and (b) comprises from 60 to 70 mole % of a diol selected from the group consisting of 2,2-dimethyl-1,3-propanediol, 1,2-cyclohexanedimethanol, 1,3-cyclohexanedimethanol, 1,4-cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 1,4-butanediol, 1,6-hexanediol and mixtures thereof, wherein the mole % is based on the total moles of (a) and (b).

In any of the above embodiments, the diacid component comprise 60 to 70 mole % of the residues of at least one alicyclic diacid comprising an anhydride and 32 to 38 mole % residues of an acyclic aliphatic diacid comprising adipic acid, succinic anhydride, succinic acid, glutaric acid and mixtures thereof, and, wherein the curable polyester is obtained with no or less than 3 mole % acids having a carboxylic acid functionality of greater than 2 based on the total moles of all carboxylic acid compound residues.

In any of the above embodiments, the comprising 20 to 30 mole % residues of (c), based on the total moles of the diols and polyol, (a), (b), and (c).

In any of the above embodiments, the comprising from 62 to 67 mole % residues of (d), based on based on the total moles of the diacids (d) and (e).

In any of the above embodiments, the acid number is less than 20 mgKOH/g of polyester.

In any of the above embodiments, the hydroxyl number is of 100 to 200 mgKOH/g of polyester and the acid number is from 5 to 15 mgKOH/g of polyester.

Group 2

There is provided a thermosetting coating solution comprising:

A. 50 to 90 weight percent, based on the total weight of (A) and (B) of at least one curable, aliphatic polyester, comprising residues of:
   i. hydroxyl component, said hydroxyl component comprising the residues of:
      a. from 5 to 45 mole %, based on the total moles of (a) and (b), of 2,2,4,4-tetraalkylcyclobutane-1,3-diol (TACD);
      b. from 55 to 95 mole % based on the total moles of (a) and (b), of a diol other than TACD; and
      c. from 3 to 35 mole %, based on the total moles of (a), (b) and (c), of a polyol;
   ii. a diacid component, said diacid component comprising the residues of:
      d. from 60 to 90 mole %, based on the total moles of the diacids (d) and (e), of an alicyclic diacid; and
      e. from 10 to 40 mole %, based on the total moles of the diacids (d) and (e), of an acyclic aliphatic diacid;
   wherein the curable polyester contains diacid residues in an amount of at least 90 mole % of aliphatic diacid residues, based on the total moles of all diacid residues in the curable polyester, and, wherein the curable polyester has a hydroxyl number of 50 to 450 mgKOH/g of polyester, an acid number of 0 to 80 mgKOH/g, and a number average molecular weight of 300 to 10,000 g/mole of polyester; and B. from 10 to 50 weight percent, based on the total weight of the solution, of a solvent other than water.

In the above embodiment, the solution has less than 1 weight % of undissolved solids.

In any of the above embodiments, the diacid is essentially free of aromatic diacid residues.

In any of the above embodiments, the TACD comprises 2,2,4,4-tetramethyl-1,3-cyclobutanediol.

In any of the above embodiments, the said diol (b) is selected from the group consisting of 2,2-dimethyl-1,3-propanediol (neopentyl glycol), 1,2-cyclohexanedimethanol, 1,3-cyclohexanedimethanol, 1,4-cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 1,4-butanediol, and 1,6-hexanediol, ethylene glycol, propylene glycol, diethylene glycol, dipropylene glycol, triethylene glycol, tetraethylene glycol, polyethylene glycol and mixtures thereof.

In any of the above embodiments, the said diol (b) is selected from the group consisting of 2,2-dimethyl-1,3-propanediol (neopentyl glycol), 1,2-cyclohexanedimethanol, 1,3-cyclohexanedimethanol, 1,4-cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 1,4-butanediol, 1,6-hexanediol and mixtures thereof.

In any of the above embodiments, wherein at least 15 mole % of the diol (b) residues is neopentyl glycol based on the total moles of diol (b).

In any of the above embodiments, the molar ratio of (b):(a) is from 1.1:1 to 2.5:1.

In any of the above embodiments, the thermosetting coating solution of claim 21, wherein the molar ratio of (b):(a) is from 1.5:1 to 2.0:1.

In any of the above embodiments, the molar ratio of (b):(a) is from 1.1:1 to 1.8:1.

In any of the above embodiments, the polyol (c) is one or more selected from the group consisting of 1,1,1-trimethylolpropane (TMP), 1,1,1-trimethylolethane, glycerin, and pentaerythritol.

In any of the above embodiments, the alicyclic diacid (d) is selected from the group consisting of hexahydrophthalic anhydride (HHPA), tetrahydrophthalic anhydride, tetrachlorophthalic anhydride, 5-norbornene-2,3-dicarboxylic anhydride, 5-norbornene-2,3-dicarboxylic acid, 2,3-norbornanedicarboxylic acid, 2,3-norbornanedicarboxylic acid anhydride, and mixtures thereof.

In any of the above embodiments, the alicyclic diacid (d) comprises hexahydrophthalic anhydride.

In any of the above embodiments, the acyclic aliphatic diacid (e) is selected from the group consisting of adipic acid, maleic anhydride, maleic acid, fumaric acid, itaconic anhydride, itaconic acid, citraconic anhydride, citraconic acid, dodecanedioic acid, sebacic acid, azelaic acid, and mixtures thereof.

In any of the above embodiments, the acyclic aliphatic diacid (e) comprises adipic acid.

In any of the above embodiments, the (a) comprises from 30 to 40 mole % 2,2,4,4-tetramethyl-1,3-cyclobutanediol and (b) comprises from 60 to 70 mole % of a diol selected from the group consisting of 2,2-dimethyl-1,3-propanediol, 1,2-cyclohexanedimethanol, 1,3-cyclohexanedimethanol, 1,4-cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 1,4-butanediol, 1,6-hexanediol and mixtures thereof, wherein the mole % is based on the total moles of (a) and (b).

In any of the above embodiments, the diacid residues comprises 60 to 70 mole % of the residues of at least one alicyclic diacid comprising an anhydride and 32 to 38 mole % residues of an acyclic aliphatic diacid comprising adipic acid, succinic acid, glutaric acid and mixtures thereof.

In any of the above embodiments, comprising 20 to 30 mole % residues of (c), based on the total moles of the diols and polyol, (a), (b), and (c).

In any of the above embodiments, comprising from 62 to 67 mole % residues of (d), based on based on the total moles of the diacids (d) and (e).

In any of the above embodiments, the curable polyester has an acid number of less than 20 mgKOH/g of polyester.

In any of the above embodiments, the curable polyester has a hydroxyl number of 100 to 200 mgKOH/g of polyester and the acid number is from 5 to 15 mgKOH/g of polyester.

In any of the above embodiments, the solvent comprises less than 3 weight % water, based on the weight of the solution.

In any of the above embodiments, the solvent is selected from the group consisting of benzene, xylene, mineral spirits, naphtha, toluene, acetone, methyl ethyl ketone, methyl n-amyl ketone, methyl isoamyl ketone, n-butyl acetate, isobutyl acetate, t-butyl acetate, n-propyl acetate, isopropyl acetate, ethyl acetate, methyl acetate, ethanol, n-propanol, isopropanol, n-butanol, sec-butanol, isobutanol, ethylene glycol monobutyl ether, propylene glycol n-butyl ether, propylene glycol methyl ether, propylene glycol monopropyl ether, dipropylene glycol methyl ether, diethylene glycol monobutyl ether, trimethylpentanediol monoisobutyrate, ethylene glycol mono-octyl ether, diacetone alcohol, 2,2,4-trimethyl-1,3-pentanediol monoisobutyrate, Aromatic 100, Aromatic 150, and combinations thereof.

In any of the above embodiments, the solvent comprises xylene, methyl amyl ketone, n-butyl acetate, Aromatic 100, and/or Aromatic 150.

Group 3

There is also provided a thermosetting monocoat coating composition comprising:
- A. 50 to 90 weight percent, based on the total weight of (A) and (C), of at least one curable, aliphatic polyester, comprising residues of:
  - i. hydroxyl component, said hydroxyl component comprising the residues of:
    - a. from 5 to 45 mole %, based on the total moles of (a) and (b), of 2,2,4,4-tetraalkylcyclobutane-1,3-diol (TACD);
    - b. from 55 to 95 mole % based on the total moles of (a) and (b), of a diol other than TACD; and
    - c. from 3 to 35 mole %, based on the total moles of (a), (b) and (c), of a polyol;
  - ii. a diacid component, said diacid component comprising the residues of:
    - d. from 60 to 90 mole %, based on the total moles of the diacids (d) and (e), of an alicyclic diacid; and
    - e. from 10 to 40 mole %, based on the total moles of the diacids (d) and (e), of an acyclic aliphatic diacid;
  - wherein the curable polyester contains diacid residues in an amount of at least 90 mole % of aliphatic diacid residues, based on the total moles of all diacid residues in the curable polyester, and, wherein the curable polyester has a hydroxyl number of 50 to 450 mgKOH/g of polyester, an acid number of 0 to 80 mgKOH/g, and a number average molecular weight of 300 to 10,000 g/mole of polyester; and
- B. from 10 to 50 weight percent, based on the total weight of the coating composition, of a solvent other than water; and
- C. from 10 to 50 weight percent, based on the total weight of (A) and (C), of a crosslinker comprising an aminoplast and/or isocyanate.

In the above embodiment, the diacid is essentially free of aromatic diacid residues.

In any of the above embodiments, the TACD comprises 2,2,4,4-tetramethyl-1,3-cyclobutanediol.

In any of the above embodiments, the diol (b) is selected from the group consisting of 2,2-dimethyl-1,3-propanediol (neopentyl glycol), 1,2-cyclohexanedimethanol, 1,3-cyclohexanedimethanol, 1,4-cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 1,4-butanediol, and 1,6-hexanediol, ethylene glycol, propylene glycol, diethylene glycol, dipropylene glycol, triethylene glycol, tetraethylene glycol, polyethylene glycol and mixtures thereof.

In any of the above embodiments, the diol (b) is selected from the group consisting of 2,2-dimethyl-1,3-propanediol (neopentyl glycol), 1,2-cyclohexanedimethanol, 1,3-cyclohexanedimethanol, 1,4-cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 1,4-butanediol, 1,6-hexanediol and mixtures thereof.

In any of the above embodiments, the diol (b) includes at least 15 mole % neopentyl glycol.

In any of the above embodiments, the molar ratio of (b):(a) is from 1.1:1 to 2.5:1.

In any of the above embodiments, the molar ratio of (b):(a) is from 1.5:1 to 2.0:1.

In any of the above embodiments, the molar ratio of (b):(a) is from 1.1:1 to 1.8:1.

In any of the above embodiments, the polyol (c) is one or more selected from the group consisting of 1,1,1-trimethylolpropane (TMP), 1,1,1-trimethylolethane, glycerin, and pentaerythritol.

In any of the above embodiments, the alicyclic diacid (d) is selected from the group consisting of hexahydrophthalic anhydride (HHPA), tetrahydrophthalic anhydride, tetrachlorophthalic anhydride, 5-norbornene-2,3-dicarboxylic anhydride, 5-norbornene-2,3-dicarboxylic acid, 2,3-norbornanedicarboxylic acid, 2,3-norbornanedicarboxylic acid anhydride, and mixtures thereof.

In any of the above embodiments, the alicyclic diacid (d) comprises hexahydrophthalic anhydride.

In any of the above embodiments, the acyclic aliphatic diacid (e) is selected from the group consisting of adipic acid, maleic anhydride, maleic acid, fumaric acid, itaconic anhydride, itaconic acid, citraconic anhydride, citraconic acid, dodecanedioic acid, sebacic acid, azelaic acid, and mixtures thereof.

In any of the above embodiments, the acyclic aliphatic diacid (e) comprises adipic acid.

In any of the above embodiments, the (a) comprises from 30 to 40 mole % 2,2,4,4-tetramethyl-1,3-cyclobutanediol and (b) comprises from 60 to 70 mole % of a diol selected from the group consisting of 2,2-dimethyl-1,3-propanediol, 1,2-cyclohexanedimethanol, 1,3-cyclohexanedimethanol, 1,4-cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 1,4-butanediol, 1,6-hexanediol and mixtures thereof, wherein the mole % is based on the total moles of (a) and (b).

In any of the above embodiments, the diacid residues comprise 60 to 70 mole % of the residues of at least one alicyclic diacid comprising an anhydride and 32 to 38 mole % residues of an acyclic aliphatic diacid comprising adipic acid, succinic acid, glutaric acid and mixtures thereof.

In any of the above embodiments, 20 to 30 mole % residues of (c), based on the total moles of the diols and polyol, (a), (b), and (c).

In any of the above embodiments, the comprising from 62 to 67 mole % residues of (d), based on based on the total moles of the diacids (d) and (e).

In any of the above embodiments, the curable polyester has an acid number of less than 20 mgKOH/g of polyester.

In any of the above embodiments, the curable polyester has a hydroxyl number of 100 to 200 mgKOH/g of polyester and the acid number is from 5 to 15 mgKOH/g of polyester.

In any of the above embodiments, the comprising from 60 to 85 weight % of the curable, aliphatic polyester (A) and from 15 to 40 weight %, of the crosslinker (C), wherein the weight % of (A) and (C) are based on the weight of the curable polyester (A) and the crosslinker (C).

In any of the above embodiments, the crosslinker (B) is an aminoplast selected from the group comprising hexamethoxymethylmelamine, tetramethoxymethylbenzo-guanamine, tetramethoxymethylurea, hexabutoxymethylmelamine, mixed butoxy/methoxy methylmelamines and mixtures thereof.

In any of the above embodiments, the crosslinker (C) comprises hexamethoxymethylmelamine.

In any of the above embodiments, the crosslinker (C) is selected from the group consisting of isocyanates and isocyanurates.

In any of the above embodiments, the crosslinker (C) is selected from the group consisting of toluene diisocyanate, isocyanurates of toluene diisocyanate, diphenylmethane 4,4'-diisocyanate, isocyanurates of 4,4'-diisocyanate, methylenebis-4,4'-isocyanatocyclohexane, isophorone diisocyanate, isocyanurates of isophorone diisocyanate, the biuret of 1,6-hexamethylene diisocyanate, 1,6-hexamethylene diisocyanate, isocyanurates of 1,6-hexamethylene diisocyanate, 1,4-cyclohexane diisocyanate, p-phenylene diisocyanate, and triphenylmethane 4,4',4"-triisocyanate, tetramethyl xylene diisocyanate, metaxylene diisocyanate, polyisocyanates, 1,4-butylene diisocyanate, methylene bis (4-cyclohexyl isocyanate), isophorone diisocyanate and isocyanate-terminated adducts of ethylene glycol, 1,4-butylene glycol, trimethylol propane, and mixtures thereof.

In any of the above embodiments, the coating has an NCO:OH ratio, on an equivalent basis, of 0.9:1.0 to 1.5:1.0.

In any of the above embodiments, further comprising a an additive or agent selective from the group consisting of leveling, rheology and flow control agents, extenders, plasticizers, flatting agents, pigment wetting and dispersing agents, ultraviolet (UV) absorbers, UV light stabilizers, defoaming and antifoaming agents, anti-settling, anti-sag and bodying agents, anti-skinning agents, anti-flooding and anti-floating agents, corrosion inhibitors and mixtures thereof.

In any of the above embodiments, the solvent comprises less than 3 weight % water, based on the weight of the solution.

In any of the above embodiments, the solvent is selected from the group consisting of benzene, xylene, mineral spirits, naphtha, toluene, acetone, methyl ethyl ketone, methyl n-amyl ketone, methyl isoamyl ketone, n-butyl acetate, isobutyl acetate, t-butyl acetate, n-propyl acetate, isopropyl acetate, ethyl acetate, methyl acetate, ethanol, n-propanol, isopropanol, n-butanol, sec-butanol, isobutanol, ethylene glycol monobutyl ether, propylene glycol n-butyl ether, propylene glycol methyl ether, propylene glycol monopropyl ether, dipropylene glycol methyl ether, diethylene glycol monobutyl ether, trimethylpentanediol monoisobutyrate, ethylene glycol mono-octyl ether, diacetone alcohol, 2,2,4-trimethyl-1,3-pentanediol monoisobutyrate, Aromatic 100, Aromatic 150, and combinations thereof.

In any of the above embodiments, the solvent comprises xylene, methyl amyl ketone, n-butyl acetate, Aromatic 100, and/or Aromatic 150.

In any of the above embodiments, further comprising applying said coating to a substrate and applying heat for a predetermined time and temperature to produce a cured coating, wherein the cured coating has an impact resistance of greater than 35 as determined in accordance with ASTM D 2794.

In any of the above embodiments, the cured coating an impact resistance of from 36 to 200 in.-lb, as determined in accordance with ASTM D 2794

In any of the above embodiments, the cured coating has an impact resistance of from 50 to 200 in.-lb, as determined in accordance with ASTM D 2794.

In any of the above embodiments, the cured coating has an impact resistance of from 60 to 200 in.-lb, as determined in accordance with ASTM D 2794.

In any of the above embodiments, the cured coating has a gloss retention, based on ASTM D 6279, of greater than 50%.

In any of the above embodiments, the cured coating has a gloss retention, based on ASTM D 6279, of greater than 55%.

In any of the above embodiments, the cured coating has a gloss retention, based on ASTM D 6279, of greater than 60%.

In any of the above embodiments, the cured coating has a gloss retention, based on ASTM D 6279, of greater than 70%.

In any of the above embodiments, the cured coating has a gloss retention, based on SAE J2527, of greater than 85% after 1000 hours.

In any of the above embodiments, the cured coating has a gloss retention, based on SAE J2527, of greater than 85% after 1500 hours.

In any of the above embodiments, the cured coating has a gloss retention, based on SAE J2527, of greater than 85% after 2000 hours.

In any of the above embodiments, the cured coating has a gloss retention, based on SAE J2527, of greater than 85% after 2500 hours.

In any of the above embodiments, the cured coating has a gloss retention, based on SAE J2527, of greater than 85% after 3000 hours.

In any of the above embodiments, the cured coating has a gloss retention, based on SAE J2527, of greater than 85% after 3500 hours.

In any of the above embodiments, the cured coating has a gloss retention, based on SAE J2527, of greater than 85% after 4000 hours.

Group 4

There is also provided a thermosetting monocoat coating composition to a substrate comprising:
  I. providing a suitable substrate for coating;
  II. providing a thermosetting monocoat coating composition comprising:
    A. 50 to 90 weight percent, based on the total weight of (A) and (C), of at least one curable, aliphatic polyester, comprising residues of:
      i. hydroxyl component, said hydroxyl component comprising the residues of:
        a. from 5 to 45 mole %, based on the total moles of (a) and (b), of 2,2,4,4-tetraalkylcyclobutane-1,3-diol (TACD);
        b. from 55 to 95 mole % based on the total moles of (a) and (b), of a diol other than TACD; and
        c. from 3 to 35 mole %, based on the total moles of (a), (b) and (c), of a polyol;
      ii. a diacid component, said diacid component comprising the residues of:
        d. from 60 to 90 mole %, based on the total moles of the diacids (d) and (e), of an alicyclic diacid; and
        e. from 10 to 40 mole %, based on the total moles of the diacids (d) and (e), of an acyclic aliphatic diacid;
    wherein the curable polyester contains diacid residues in an amount of at least 90 mole % of aliphatic diacid residues, based on the total moles of all diacid residues in the curable polyester, and, wherein the curable polyester has a hydroxyl number of 50 to 450 mgKOH/g of polyester, an acid number of 0 to 80 mgKOH/g, and a number average molecular weight of 300 to 10,000 g/mole of polyester;
    B. from 10 to 50 weight percent, based on the total weight of the coating composition, of a solvent other than water; and
    C. from 10 to 50 weight percent, based on the total weight of (A) and (C), of a crosslinker comprising an aminoplast and/or isocyanate;

III. applying said thermosetting monocoat coating composition to said substrate to produce a coated substrate; and IV. applying heat to the coated substrate to a predetermined temperature and for a predetermined time to produce a cured coating.

In the above embodiment, the diacid is essentially free of aromatic diacid residues.

In any of the above embodiments, the TACD is 2,2,4,4-tetramethyl-1,3-cyclobutanediol.

In any of the above embodiments, the diol (b) is selected from the group consisting of 2,2-dimethyl-1,3-propanediol (neopentyl glycol), 1,2-cyclohexanedimethanol, 1,3-cyclohexanedimethanol, 1,4-cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 1,4-butanediol, and 1,6-hexanediol, ethylene glycol, propylene glycol, diethylene glycol, dipropylene glycol, triethylene glycol, tetraethylene glycol, polyethylene glycol and mixtures thereof.

In any of the above embodiments, the diol (b) is selected from the group consisting of 2,2-dimethyl-1,3-propanediol (neopentyl glycol), 1,2-cyclohexanedimethanol, 1,3-cyclohexanedimethanol, 1,4-cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 1,4-butanediol, 1,6-hexanediol and mixtures thereof.

In any of the above embodiments, the diol (b) includes at least 15 mole % neopentyl glycol.

In any of the above embodiments, the molar ratio of (b):(a) is from 1.1:1 to 2.5:1.

In any of the above embodiments, the molar ratio of (b):(a) is from 1.5:1 to 2.0:1.

In any of the above embodiments, the molar ratio of (b):(a) is from 1.1:1 to 1.8:1.

In any of the above embodiments, the polyol (c) is one or more selected from the group consisting of 1,1,1-trimethylolpropane (TMP), 1,1,1-trimethylolethane, glycerin, and pentaerythritol.

In any of the above embodiments, the alicyclic diacid (d) is selected from the group consisting of hexahydrophthalic anhydride (HHPA), tetrahydrophthalic anhydride, tetrachlorophthalic anhydride, 5-norbornene-2,3-dicarboxylic anhydride, 5-norbornene-2,3-dicarboxylic acid, 2,3-norbornanedicarboxylic acid, 2,3-norbornanedicarboxylic acid anhydride, and mixtures thereof.

In any of the above embodiments, the alicyclic diacid (d) comprises hexahydrophthalic anhydride.

In any of the above embodiments, the acyclic aliphatic diacid (e) is selected from the group consisting of adipic acid, maleic anhydride, maleic acid, fumaric acid, itaconic anhydride, itaconic acid, citraconic anhydride, citraconic acid, dodecanedioic acid, sebacic acid, azelaic acid, and mixtures thereof.

In any of the above embodiments, the acyclic aliphatic diacid (e) comprises adipic acid.

In any of the above embodiments, the (a) comprises from 30 to 40 mole % 2,2,4,4-tetramethyl-1,3-cyclobutanediol and (b) comprises from 60 to 70 mole % of a diol selected from the group consisting of 2,2-dimethyl-1,3-propanediol, 1,2-cyclohexanedimethanol, 1,3-cyclohexanedimethanol, 1,4-cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 1,4-butanediol, 1,6-hexanediol and mixtures thereof, wherein the mole % is based on the total moles of (a) and (b).

In any of the above embodiments, the diacid residues comprise 60 to 70 mole % of the residues of at least one alicyclic diacid comprising an anhydride and 32 to 38 mole % residues of an acyclic aliphatic diacid comprising adipic acid, succinic acid, glutaric acid and mixtures thereof.

In any of the above embodiments, the monocoat coating composition comprises 20 to 30 mole % residues of (c), based on the total moles of the diols and polyol, (a), (b), and (c).

In any of the above embodiments, the monocoat coating composition comprises from 62 to 67 mole % residues of (d), based on based on the total moles of the diacids (d) and (e).

In any of the above embodiments, the polyester in said monocoat coating composition has an acid number of less than 20 mgKOH/g of polyester.

In any of the above embodiments, the polyester in said monocoat coating has a hydroxyl number of 100 to 200 mgKOH/g of polyester and the acid number is from 5 to 15 mgKOH/g of polyester.

In any of the above embodiments, the monocoat coating composition comprises from 60 to 85 weight % of the curable, aliphatic polyester (A) and from 15 to 40 weight %, of the crosslinker (C), wherein the weight % of (A) and (C) are based on the weight of the curable polyester (A) and the crosslinker (C).

In any of the above embodiments, the crosslinker (C) is an aminoplast selected from the group comprising hexamethoxymethylmelamine, tetramethoxymethylbenzo-guanamine, tetramethoxymethylurea, hexabutoxymethylmelamine, mixed butoxy/methoxy methylmelamines and mixtures thereof.

In any of the above embodiments, the crosslinker (C) comprises hexamethoxymethylmelamine.

In any of the above embodiments, the crosslinker (C) is selected from the group consisting of isocyanates and isocyanurates.

In any of the above embodiments, the crosslinker (C) is selected from the group consisting of toluene diisocyanate, isocyanurates of toluene diisocyanate, diphenylmethane 4,4'-diisocyanate, isocyanurates of 4,4'-diisocyanate, methylenebis-4,4'-isocyanatocyclohexane, isophorone diisocyanate, isocyanurates of isophorone diisocyanate, the biuret of 1,6-hexamethylene diisocyanate, 1,6-hexamethylene diisocyanate, isocyanurates of 1,6-hexamethylene diisocyanate, 1,4-cyclohexane diisocyanate, p-phenylene diisocyanate, and triphenylmethane 4,4',4"-triisocyanate, tetramethyl xylene diisocyanate, metaxylene diisocyanate, polyisocyanates, 1,4-butylene diisocyanate, methylene bis (4-cyclohexyl isocyanate), isophorone diisocyanate and isocyanate-terminated adducts of ethylene glycol, 1,4-butylene glycol, trimethylol propane, and mixtures thereof.

In any of the above embodiments, the monocoat coating composition has an NCO:OH ratio, on an equivalent basis, of 0.9:1.0 to 1.5:1.0.

In any of the above embodiments, the monocoat coating composition further comprises a an additive or agent selectived from the group consisting of leveling, rheology and flow control agents, extenders, plasticizers, flatting agents, pigment wetting and dispersing agents, ultraviolet (UV) absorbers, UV light stabilizers, defoaming and antifoaming agents, anti-settling, anti-sag and bodying agents, anti-skinning agents, anti-flooding and anti-floating agents, corrosion inhibitors and mixtures thereof.

In any of the above embodiments, the cured coating has an impact resistance of greater than 35 in.-lb as determined in accordance with ASTM D 2794.

In any of the above embodiments, the cured coating has an impact resistance of from 36 to 200 in.-lb, as determined in accordance with ASTM D 2794.

In any of the above embodiments, the cured coating has an impact resistance of from 50 to 200 in.-lb, as determined in accordance with ASTM D 2794.

In any of the above embodiments, the cured coating has an impact resistance of from 60 to 200 in.-lb, as determined in accordance with ASTM D 2794.

In any of the above embodiments, the cured coating has a gloss retention, based on ASTM D 6279, of greater than 50%.

In any of the above embodiments, the cured coating has a gloss retention, based on ASTM D 6279, of greater than 55%.

In any of the above embodiments, the cured coating has a gloss retention, based on ASTM D 6279, of greater than 60%.

In any of the above embodiments, the cured coating has a gloss retention, based on ASTM D 6279, of greater than 70%.

In any of the above embodiments, the cured coating has a gloss retention, based on SAE J2527, of greater than 85% after 1000 hours.

In any of the above embodiments, the cured coating has a gloss retention, based on SAE J2527, of greater than 85% after 1500 hours.

In any of the above embodiments, the cured coating has a gloss retention, based on SAE J2527, of greater than 85% after 2000 hours.

In any of the above embodiments, the cured coating has a gloss retention, based on SAE J2527, of greater than 85% after 2500 hours.

In any of the above embodiments, the cured coating has a gloss retention, based on SAE J2527, of greater than 85% after 3000 hours.

In any of the above embodiments, the cured coating has a gloss retention, based on SAE J2527, of greater than 85% after 3500 hours.

In any of the above embodiments, the cured coating has a gloss retention, based on SAE J2527, of greater than 85% after 4000 hours.

In any of the above embodiments, the substrate is selected from the group consisting of wood, metal and polymers.

In any of the above embodiments, the substrate is metal.

In any of the above embodiments, the metal substrate is at least one surface of an automobile.

In any of the above embodiments, the applying the thermosetting monocoat coating composition to the substrate step comprises brushing, spraying, and roll coating.

In any of the above embodiments, the coating is applied by spraying, wherein said spraying comprises rotational bell spraying.

In any of the above embodiments, the heating step comprises heating said coated substrate to a temperature of from 35° C. to 400° C. for a period of from 5 seconds to 5 hours.

In any of the above embodiments, the heating step comprises heating said coated substrate to a temperature of from 50° C. to 200° C. for a period of from 5 seconds to 5 hours.

In any of the above embodiments, the heating step comprises heating said coated substrate to a temperature of from 60° C. to 175° C. for a period of from 5 seconds to 5 hours.

In any of the above embodiments, the heating step comprises heating said coated substrate to a temperature of from 80° C. to 175° C. for a period of from 5 seconds to 5 hours.

In any of the above embodiments, the period is from 10 minutes to 4 hours.

In any of the above embodiments, the period is from 20 minutes to 3 hours.

In any of the above embodiments, the period is from 30 minutes to 1 hour.

In any of the above embodiments, the solvent in said thermosetting monocoat coating comprises less than 3 weight % water, based on the weight of the solution.

In any of the above embodiments, the solvent in said thermosetting monocoat coating is selected from the group consisting of benzene, xylene, mineral spirits, naphtha, toluene, acetone, methyl ethyl ketone, methyl n-amyl ketone, methyl isoamyl ketone, n-butyl acetate, isobutyl acetate, t-butyl acetate, n-propyl acetate, isopropyl acetate, ethyl acetate, methyl acetate, ethanol, n-propanol, isopropanol, n-butanol, sec-butanol, isobutanol, ethylene glycol monobutyl ether, propylene glycol n-butyl ether, propylene glycol methyl ether, propylene glycol monopropyl ether, dipropylene glycol methyl ether, diethylene glycol monobutyl ether, trimethylpentanediol mono-isobutyrate, ethylene glycol mono-octyl ether, diacetone alcohol, 2,2,4-trimethyl-1,3-pentanediol monoisobutyrate, Aromatic 100, Aromatic 150, and combinations thereof.

In any of the above embodiments, the solvent comprises xylene, methyl amyl ketone, n-butyl acetate, Aromatic 100, and/or Aromatic 150.

The invention is further illustrated by the following examples.

The present invention is illustrated in greater detail by the specific examples presented below. It is to be understood that these examples are illustrative embodiments and are not intended to be limiting of the invention, but rather are to be construed broadly within the scope and content of the appended claims. All parts and percentages in the examples are on a weight basis unless otherwise stated.

EXAMPLES

Preparation of Curable, Aliphatic Polyesters

The examples and comparative aliphatic polyester resins (Tables 1 and 2) were prepared according to the following procedure, calculation parameters included a number average molecular weight=1000, a hydroxyl equivalent weight=400, a hydroxyl functionality=2.5 and final acid number=10. For example PE3, calculation parameters included a number average molecular weight=1300, a hydroxyl equivalent weight=400, a hydroxyl functionality=3.25 and final acid number=10.

Example PE1

The resin was prepared using a solvent process to help remove the water of esterification. The resin was prepared in a two-liter reaction kettle equipped with a heating mantle, mechanical stirrer, thermocouple, nitrogen blanket (1.0 scfh), oil-heated partial condenser (103° C.–105° C.), condensate trap, and water-cooled total condenser (15° C.). The condensate trap, kettle top and adapter from the kettle to the column were insulated by aluminum foil and fiberglass tape to facilitate water removal. A 0.25 wt. % excess of NPG and TMCD was added to the charge weight to compensate for glycol losses, and triphenylphosphite was added as a color stabilizer.

Stage 1—HHPA, TMP, TMCD and excess triphenylphosphite and xylene were charged to the reactor. Additional xylene (approximately 30 g) was used to fill the condensate trap. The temperature was then increased from room temperature to 75° C. over fifty (50) minutes to form a homogenous melt. Agitation (300 rpm) was started and the temperature increased to a maximum of 165° C. over sixty (60) minutes. The reaction was held at 165° C. for 30 minutes, and no water was collected.

Stage 2—NPG (and excess NPG), TMP, AD and catalyst were added to the reactor and heated to 230° C. and held at this temperature until the final acid number, approximately 10 mg KOH/g resin, was achieved. The resin was cooled to 200° C. and poured through a medium mesh paint filter into a metal paint can.

The acid number (abbreviated "AN"), hydroxyl number (abbreviated "OHN"), number average molecular weight (abbreviated "Mn"), weight average molecular weight (abbreviated "Mw"), z-average molecular weight (abbreviated as "Mz"), molecular weight distribution polydispersity index (abbreviated "Mw/Mn"), and glass transition temperature (abbreviated "Tg") of the polyesters are shown in Table 2 below. Acid number was determined using ASTM method D 1639.

Hydroxyl number was determined by esterifying the resin by reaction with excess acetic anhydride in pyridine and then decomposing the unreacted anhydride with water. The resulting acetic acid is then titrated with a standard solution of KOH. The number of milligrams KOH which are equivalent to one gram of resin sample is reported as the hydroxyl number.

Number average molecular weight was determined by gel permeation chromatography using a refractive index detector with polystyrene standards.

Residual solvent remaining in the resin from solvent processing could artificially lower the Tg measurement. To obtain a more accurate Tg, a resin sample was first subjected to preconditioning in an oven. 0.3 g-0.5 g of the resin was placed into a sample tin and heated to 150° C. The sample remained in the oven for 14-16 hours (overnight). The sample was then transferred to a differential scanning calorimeter (TA Instruments DSC Q2000 V24.9 Build 121). On the first heating cycle, the sample was heated under nitrogen atmosphere from −50° C. to 140° C. at a rate of 20° C./min. The sample was then quench cooled to −50° C. For the second heating cycle, the sample was heated under the same conditions as those used in the first heating cycle. The midpoint of the second heating cycle is reported as the Tg of the sample.

Melt viscosity (ASTM D 4287) was measured with a Brookfield CAP 2000 cone and plate viscometer using spindle 03 and 300 rpm at 100° C. The sample was heated on the plate for 60 seconds before determining viscosity.

Example PE2

The resin was prepared using a solvent process to help remove the water of esterification. The resin was prepared in a two-liter reaction kettle equipped with a heating mantle, mechanical stirrer, thermocouple, nitrogen blanket (1.0 scfh), oil-heated partial condenser (103° C.–105° C.), condensate trap, and water-cooled total condenser (15° C.). The condensate trap, kettle top and adapter from the kettle to the column were insulated by aluminum foil and fiberglass tape to facilitate water removal. A 0.25 wt. % excess of NPG and TMCD was added to the charge weight to compensate for glycol losses, and triphenylphosphite was added as a color stabilizer.

Stage 1—HHPA, AD, TMCD (and excess TMCD), triphenylphosphite and xylene were charged to the reactor. The temperature was then increased from room temperature to 75° C. over fifty (50) minutes to form a homogenous melt. Agitation (300 rpm) was started and the temperature increased to a maximum of 165° C. over sixty (60) minutes. The reaction was held at 165° C. for 30 minutes. The temperature was increased to 210° C. over 45 minutes and held until approximately 8 grams of water was collected.

Stage 2—The reaction mixture was cooled to 170° C. NPG (and excess NPG), TMP and catalyst were charged to the reactor. The reaction mixture was then heated to 230° C. over 120 minutes.

Stage 3—The remaining TMP was added to the reaction when 85 grams of water was collected. The reaction temperature was held at 230° C. until the final acid number was reached. The resin was then cooled to 200° C. and poured through a medium mesh paint filter into a metal paint can.

Example PE3

The resin was prepared using a solvent process to help remove the water of esterification. The resin was prepared in a two-liter reaction kettle equipped with a heating mantle, mechanical stirrer, thermocouple, nitrogen blanket (1.0 scfh), oil-heated partial condenser (103° C.–105° C.), condensate trap, and water-cooled total condenser (15° C.). The condensate trap, kettle top and adapter from the kettle to the column were insulated by aluminum foil and fiberglass tape to facilitate water removal. A 0.25 wt. % excess of NPG and TMCD was added to the charge weight to compensate for glycol losses, and triphenylphosphite was added as a color stabilizer.

Stage 1—HHPA, AD, TMCD (and excess TMCD), triphenylphosphite and xylene were charged to the reactor. The temperature was then increased from room temperature to 75° C. over fifty (50) minutes to form a homogenous melt. Agitation (300 rpm) was started and the temperature increased to a maximum of 170° C. over sixty (60) minutes. The reaction was held at 170° C. for 60 minutes. The temperature was increased to 220° C. over 50 minutes and held until approximately 37 grams of water was collected.

Stage 2—The reaction mixture was cooled to 170° C. NPG (and excess NPG), TMP and catalyst were charged to the reactor. The reaction mixture was then heated to 230° C. over 120 minutes. The reaction was held at 230° C. until the final acid number. The resin was then cooled to 200° C. and poured through a medium mesh paint filter into a metal paint can.

Comparative Example 1—CPE 1

The resin was prepared using a solvent process to help remove the water of esterification. The resin was prepared in a two-liter reaction kettle equipped with a heating mantle, mechanical stirrer, thermocouple, nitrogen blanket (1.0 scfh), oil-heated partial condenser (103° C.–105° C.), condensate trap, and water-cooled total condenser (15° C.). The condensate trap, kettle top and adapter from the kettle to the column were insulated by aluminum foil and fiberglass tape to facilitate water removal. A 0.25 wt. % excess of NPG and TMCD was added to the charge weight to compensate for glycol losses, and triphenylphosphite was added as a color stabilizer.

Stage 1—HHPA, AD, TMCD (and excess TMCD), triphenylphosphite and xylene were charged to the reactor. The temperature was then increased from room temperature to 75° C. over fifty (50) minutes to form a homogenous melt. Agitation (300 rpm) was started and the temperature increased to a maximum of 165° C. over sixty (60) minutes.

The reaction was held at 165° C. for 30 minutes. The temperature was increased to 210° C. over 45 minutes and held until approximately 24 grams of water was collected.

Stage 2—The reaction mixture was cooled to 170° C. NPG (and excess NPG), TMP and catalyst were charged to the reactor. The reaction mixture was then heated to 230° C. over 120 minutes.

Stage 3—The remaining TMP was added to the reaction when 74 grams of water was collected. The reaction temperature was held at 230° C. until the final acid number was reached. The resin was then cooled to 200° C. and poured through a medium mesh paint filter into a metal paint can.

Comparative Example 2—CPE 2

The resin was prepared using a solvent process to help remove the water of esterification. The resin was prepared in a two-liter reaction kettle equipped with a heating mantle, mechanical stirrer, thermocouple, nitrogen blanket (1.0 scfh), oil-heated partial condenser (103° C.–105° C.), condensate trap, and water-cooled total condenser (15° C.). The condensate trap, kettle top and adapter from the kettle to the column were insulated by aluminum foil and fiberglass tape to facilitate water removal. A 0.25 wt. % excess of NPG and TMCD was added to the charge weight to compensate for glycol losses, and triphenylphosphite was added as a color stabilizer.

Stage 1—HHPA, TMP, TMCD (and excess TMCD), triphenylphosphite and xylene were charged to the reactor. The temperature was then increased from room temperature to 75° C. over fifty (50) minutes to form a homogenous melt. Agitation (300 rpm) was started and the temperature increased to a maximum of 165° C. over sixty (60) minutes. The reaction was held at 165° C. for 30 minutes, and no water was collected.

Stage 2—NPG (and excess NPG), TMP, AD and catalyst were added to the reactor and heated to 230° C. over 120 minutes. The reaction was held at 230° C. until the final acid number was achieved. The resin was cooled to 200° C. and poured through a medium mesh paint filter into a metal paint can.

TABLE 1

Molar Composition of Polymer Resins

| Polyester Polyol | Composition (mole %) | | | | |
|---|---|---|---|---|---|
| Example No. | TMCD | NPG | TMP | HHPA | AD |
| PE 1 | 9.3 | 37.3 | 8.4 | 36.0 | 9.0 |
| PE 2 | 16.3 | 30.3 | 8.4 | 29.2 | 15.7 |
| PE 3 | 13.82 | 25.67 | 14.19 | 30.11 | 16.21 |
| CPE 1 | 23.2 | 23.2 | 8.8 | 35.8 | 9.0 |
| CPE2 | 9.4 | 37.5 | 8.0 | 22.6 | 22.6 |

TABLE 2

Polyester Resin Charge Weights (Grams) and Determined Resin Properties

| Polyester resin | Example PE 1 | Example PE 2 | Example PE 3 | Comparative CPE 1 | Comparative CPE 2 |
|---|---|---|---|---|---|
| Stage 1 | | | | | |
| TMCD[a],[b] | 186.18 | 322.74 | 223.35 | 443.08 | 192.69 |
| TMP[c] | 77.66 | — | 106.63 | — | 76.72 |
| HHPA[d] | 767.71 | 617.87 | 520.01 | 730.33 | 495.58 |
| AD[e] | — | 315.37 | 265.42 | 173.07 | — |
| Triphenylphosphite | 1.83 | 1.84 | 1.52 | 1.82 | 1.87 |
| Xylene process solvent | 18.29 | 18.44 | 15.22 | 18.22 | 18.68 |
| Stage 2 | | | | | |
| NPG[a],[f] | 537.86 | 432.87 | 299.57 | 319.99 | 556.66 |
| TMP | 77.66 | 77.77 | 106.63 | 77.99 | 76.72 |
| AD | 181.93 | — | — | — | 469.77 |
| Fascat 4100 catalyst[g] | 1.83 | 1.84 | 1.52 | 1.82 | 1.87 |
| Stage 3 | | | | | |
| TMP | — | 77.77 | — | 77.99 | — |
| Total Charge | 1850.95 | 1866.50 | 1539.87 | 1844.31 | 1890.55 |
| Minus Theo. Condensate | 129.00 | 144.38 | 121.61 | 122.45 | 168.13 |
| Yield | 1721.95 | 1722.12 | 1418.26 | 1721.86 | 1722.42 |
| Determined Resin Properties | | | | | |
| AN, mg KOH/g resin | 10 | 10 | 10 | 10 | 10 |
| OHN, mg KOH/g resin | 128 | 129 | 131 | 127 | 130 |
| $M_z$ | 5710 | 6895 | 16320 | 6418 | 8356 |
| $M_w$ | 2785 | 3297 | 6457 | 3068 | 3905 |
| $M_n$ | 1268 | 1398 | 1542 | 1332 | 1498 |
| $M_w/M_n$ | 2.20 | 2.36 | 4.19 | 2.30 | 2.61 |
| Tg, ° C. | 7 | 2 | 9 | 16 | −12 |
| Melt viscosity at 100° C., P | 25.9 | 19.6 | — | 48.9 | 9.33 |

[a]Add 0.25 wt. % glycol excess based on calculated charge weights
[b]2,2,4,4-tetramethyl-1,3-cyclobutanediol (Eastman)
[c]Trimethylolpropane (Perstorp)
[d]Hexahydrophthalic anhydride (Dixie Chemical)
[e]Adipic acid (Ascend Performance Materials)
[f]2,2-Dimethyl-1,3-propanediol (Eastman)
[g]Butylstannoic acid (PMC Organometallix)

Thermosetting Monocoat Preparation and Evaluation
Prepartion of White Monocoats:

White pigmented thermosetting monocoats were prepared by mixing the ingredients listed in Table 3. The polyester samples prepared in table 2 were pre-dissolved into butylacetate to form 75% solid solutions. Mill base portion were added to a stainless steel pot in listed order and pre-dispersed using a cowles blade at 2000 rpm for 20 minutes. The mixture was then pulled into a Mini Motor Mill 250 from Eiger Machinery Inc. The mill base was ground at 4000 rpm to 7+ on a Hegman gage. Then the mill base was pulled out. The mill was washed with pre-mixed "Wash mill" portion. The let down portion was pre-mixed in a container and added to a grinding paste and agitated to form uniformed monocoat. The viscosity of the white monocoats was adjusted with aromatic 100 to 30 second measured using a #4 Ford cup.

TABLE 3

Thermosetting Monocoat Formulation

| | Ingredients | Nonvolatile matter (%) | Formula | Description |
|---|---|---|---|---|
| | Grinding paste Mill Base | | | |
| A | 75% solids polyester polyol in table 2 | 75 | 80.4 | |
| B | Aromatic 100 | 0 | 27.6 | |

TABLE 3-continued

Thermosetting Monocoat Formulation

| Ingredients | Nonvolatile matter (%) | Formula | Description |
|---|---|---|---|
| C Disper BYK 110 | 52 | 9.6 | Pigment wetting |
| D AEROSIL 972 | 100 | 1.6 | Anti-settling agent |
| E TI-PURE TIO2 R706 | 100 | 240.3 | TiO2 |
| G Aromatic 100 | 0 | 13.8 | |
| | | Wash Mill | |
| 75% solids polyester polyol in table 2 | 75 | 80.4 | |
| Aromatic -100 | 0 | 27.6 | |
| | | Let Down | |
| 75% solids polyester polyol in table 2 | 75 | 220.8 | Melamine from Nuplex |
| Setamine US138 | 70 | 186.9 | Melamine from Nuplex resins |
| Aromatic 100 | 0 | 87.2 | |
| Tinuvin 292 | 100 | 4.6 | UV additive |
| Tinuvin 1130 | 100 | 9.0 | UV additive |
| 10% Disper BYK 331 in xylem | 10 | 3.7 | |
| Nacure 2500 | 25 | 6.6 | |
| Total | | 1000.0 | |

White Monocoat Evaluation Results

A wire wound rod was used to apply the coating to polished cold rolled steel test panels with elecrodeposit coat and topcoated with a gray primer. Panels were purchased from ACT Test Panels LLC and the steel thickness is 0.032 inch. The rod was selected to achieve a 40 microns dry film thickness. Coated panels were flashed 10 minutes at room temperature and then cured at 140° C. for 30 minutes.

Hardness was determined using two methods: a BYK-Gardner pendulum hardness tester (ASTM D 4366); and pencil test (ASTM D 3363). For pencil hardness, the value reported was the last pencil that did not cut through the coating to the metal substrate. Flexibility of the monocoats were tested using both Conical mandrel bending and impact tester. The TQC Bend Tester from Gardner was used for Conical mandrel bending. Test was done as per ASTM D522. Impact resistance was measured with a Gardco Model 172 universal impact tester (ASTM D 2794). The indenter punch used was IM-172-2 with additional auxiliary 2 pound weight, the diameter being 0.64 of an inch (1.63 centimeters). The values reported are the last impact that did not produce any cracks in the coating film or delamination of the coating from the substrate. Abrasion resistance was tested using an AATCC Crockmeter; Model CM-5 as per ASTM D 6279; load 10 N, paper was 9 micron 3M paper; rubs: diameter of disc was 16 millimeters, stroke length was 10 centimeters; the 20 degree gloss retention was determined by averaging two testing results. Outdoor durability of the monocoats was determined using a Xenon Weatherometer following SAE J2527 testing procedure. Tables 4 and 5 shows the evaluation results of the monocoats.

TABLE 4

| Monocoat Formulation | Conical Mandrel | Impact (lbs) | König (sec) | Pencil to mark | Crock meter: 20 degree gloss | | | | Gloss retention on abrasion |
|---|---|---|---|---|---|---|---|---|---|
| | | | | | Initial | Test 1 | Test 2 | Average | |
| MC 1 using PE 1 | P | 36 | 132 | F | 87 | 50 | 47 | 48.5 | 55.7 |
| MC 2 using PE 2 | P | 60 | 94 | HB | 87 | 52 | 49 | 50.5 | 58.0 |
| MC 3 using PE 3 | P | 50 | 134 | F | 87 | 54 | 57 | 55.5 | 63.8 |
| Comp. MC 1 using CPE1 | Fail | 20 | 154 | HB | 86 | 40 | 45 | 42.5 | 49.4 |
| Comp MC 2 using CPE2 | P | 105 | 61 | B | 87 | 63 | 60 | 61.5 | 70.7 |

Key requirements for the monocoat are: Pass Conical mandrel testing; impact resistance >35 Ib.in; Pencil hardness >= HB; Gloss retention after Crock meter >= 50%; and 20 degree gloss retention after 2500 hours of Xenon is >= 85%.

Key requirements for the monocoat are: Pass Conical mandrel testing; impact resistance >35 in.-lb; Pencil hardness >=HB; Gloss retention after Crock meter >=50%; and 20 degree gloss retention after 2500 hours of Xenon is >=85%.

TABLE 5

Xenon Arc Accelarated Weathering Gloss And Gloss Retention

| Monocoat polyester | MC 1 Example PE 1 | MC 2 Example PE 2 | MC 3 Example PE 3 | Comp. MC1 Comp. PE 1 | Comp. MC2 Comp. PE 2 |
|---|---|---|---|---|---|
| Exposure hours | 20° Gloss | | | | |
| 0 | 87.7 | 84.7 | 83.4 | 89.1 | 85.3 |
| 250 | 88.8 | 86.7 | 88.8 | 89.2 | 86.5 |
| 500 | 87.1 | 83.9 | 85.3 | 85.8 | 85.9 |
| 750 | 86.6 | 82.3 | 85.8 | 85.3 | 79.9 |
| 973 | 87.9 | 81.3 | 85.9 | 83.5 | 77.1 |
| 1250 | 89.0 | 82.2 | 85.7 | 86.0 | 73.5 |
| 1555 | 85.6 | 77.1 | 83.6 | 87.9 | 72.0 |
| 1750 | 84.5 | 76.0 | 84.2 | 88.6 | 71.0 |
| 2031 | 89.8 | 79.7 | 83.9 | 88.7 | 67.0 |
| 2250 | 83.6 | 78.8 | 80.8 | 82.0 | 64.0 |
| 2506 | 83.7 | 82.2 | 81.0 | 81.0 | 67.8 |
| 2740 | 83.0 | 82.0 | 80.0 | 88.0 | 65.8 |
| 3000 | 88.0 | 80.0 | 81.2 | 86.0 | 61.2 |
| 3257 | 84.0 | 78.0 | 78.8 | 80.3 | 59.2 |

TABLE 5-continued

Xenon Arc Accelarated Weathering Gloss And Gloss Retention

| Monocoat polyester | MC 1 Example PE 1 | MC 2 Example PE 2 | MC 3 Example PE 3 | Comp. MC1 Comp. PE 1 | Comp. MC2 Comp. PE 2 |
|---|---|---|---|---|---|
| Exposure hours | | | 20° Gloss retention [%] | | |
| 0 | 100 | 100 | 100 | 100 | 100 |
| 250 | 101 | 102 | 106 | 100 | 101 |
| 500 | 99 | 99 | 102 | 96 | 101 |
| 750 | 99 | 97 | 103 | 96 | 94 |
| 973 | 100 | 96 | 103 | 94 | 90 |
| 1250 | 101 | 97 | 103 | 97 | 86 |
| 1555 | 98 | 91 | 100 | 99 | 84 |
| 1750 | 96 | 90 | 101 | 99 | 83 |
| 2031 | 102 | 94 | 101 | 100 | 79 |
| 2250 | 95 | 93 | 97 | 92 | 75 |
| 2506 | 95 | 97 | 97 | 91 | 80 |
| 2740 | 95 | 97 | 96 | 99 | 77 |
| 3000 | 100 | 95 | 97 | 97 | 72 |
| 3257 | 96 | 92 | 94 | 90 | 69 |

Having described the invention in detail, those skilled in the art will appreciate that modifications may be made to the various aspects of the invention without departing from the scope and spirit of the invention disclosed and described herein. It is, therefore, not intended that the scope of the invention be limited to the specific embodiments illustrated and described but rather it is intended that the scope of the present invention be determined by the appended claims and their equivalents. Moreover, all patents, patent applications, publications, and literature references presented herein are incorporated by reference in their entirety for any disclosure pertinent to the practice of this invention.

We claim:

1. A method for applying a thermosetting monocoat coating composition to a substrate comprising:
   I. providing a substrate for coating;
   II. providing a thermosetting monocoat coating composition comprising:
      A. 50 to 90 weight percent, based on the total weight of (A) and (C), of at least one curable, aliphatic polyester, comprising residues of:
         i. hydroxyl component, said hydroxyl component comprising the residues of:
            a. from 5 to 45 mole %, based on the total moles of (a) and (b), of 2,2,4,4-tetraalkylcyclobutane-1,3-diol (TACD);
            b. from 55 to 95 mole % based on the total moles of (a) and (b), of a diol other than TACD; and
            c. from 3 to 35 mole %, based on the total moles of (a), (b) and (c), of a polyol;
         ii. a diacid component, said diacid component comprising the residues of:
            d. from 60 to 90 mole %, based on the total moles of the diacids (d) and (e), of an alicyclic diacid; and
            e. from 10 to 40 mole %, based on the total moles of the diacids (d) and (e), of an acyclic aliphatic diacid;
      wherein the curable polyester contains diacid residues in an amount of at least 90 mole % of aliphatic diacid residues, based on the total moles of all diacid residues in the curable polyester, and, wherein the curable polyester has a hydroxyl number of 50 to 450 mgKOH/g of polyester, an acid number of 0 to 80 mgKOH/g, and a number average molecular weight of 300 to 10,000 g/mole of polyester;
      B. from 10 to 50 weight percent, based on the total weight of the coating composition, of a solvent other than water; and
      C. from 10 to 50 weight percent, based on the total weight of (A) and (C), of a crosslinker comprising an aminoplast and/or isocyanate;
   III. applying said thermosetting monocoat coating composition to said substrate to produce a coated substrate; and
   IV. applying heat to the coated substrate to a predetermined temperature and for a predetermined time to produce a cured coating wherein the cured coating has an impact resistance of greater than 35 in.-lb as determined in accordance with ASTM D 2794, wherein said cured coating has a gloss retention, after abrasion, based on ASTM D 6279, of greater than 50%, and wherein said cured coating has a gloss retention, based on SAE J2527, of greater than 85% after 2000 hours.

2. The method of claim 1, wherein said TACD is 2,2,4,4-tetramethyl-1,3-cyclobutanediol.

3. The method of claim 1, wherein said the alicyclic diacid (d) comprises hexahydrophthalic anhydride (HHPA).

4. The method of claim 1, wherein said polyester in said monocoat coating composition has an acid number of less than 20 mgKOH/g of polyester.

5. The method of claim 1, wherein said polyester in said monocoat coating has a hydroxyl number of 100 to 200 mgKOH/g of polyester.

6. The method of claim 1, wherein said cured coating has an König hardness of from 60 to 200 sec, as determined in accordance with ASTM D 4366 (König).

7. The method of claim 1, wherein said cured coating has a gloss retention, based on SAE J2527, of greater than 85% after 4000 hours.

8. The method of claim 1, wherein said applying the thermosetting monocoat coating composition to the substrate step comprises brushing, spraying, and roll coating.

9. The method of claim 8, comprising spraying, wherein said spraying comprises rotational bell spraying.

10. The method of claim 9, wherein said heating step comprises heating said coated substrate to a temperature of from 60° C. to 200° C. for a period of from 5 seconds to 5 hours.

11. The method of claim 10, wherein said period is from 10 minutes to 1 hour.

12. The method of claim 1, wherein said solvent in said thermosetting monocoat coating comprises less than 3 weight % water, based on the weight of the solution.

13. The method of claim 1, wherein the crosslinker (C) is an aminoplast selected from the group comprising hexamethoxymethylmelamine, tetramethoxymethyin.-lbenzo-guanamine, tetramethoxymethylurea, hexabutoxymethylmelamine, mixed butoxy/methoxy methylmelamines and mixtures thereof.

14. The method of claim 1 wherein the diol (b) is selected from the group consisting of 2,2-dimethyl-1,3-propanediol (neopentyl glycol), 1,2-cyclohexanedimethanol, 1,3-cyclohexanedimethanol, 1,4-cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 1,4-butanediol, 1,6-hexanediol and mixtures thereof.

15. The method of claim 1, wherein at least 15 mole % of the diol (b) residues is neopentyl glycol based on the total moles of diol (b).

16. The method of claim 1, wherein the molar ratio of (b):(a) is from 1.5:1 to 2.0:1.

17. The method of claim 1, wherein the polyol (c) is one or more selected from the group consisting of 1,1,1-trimethylolpropane (TMP), 1,1,1-trimethylolethane, glycerin, and pentaerythritol.

18. The method of claim 1, wherein the alicyclic diacid (d) is selected from the group consisting of hexahydrophthalic anhydride (HHPA), tetrahydrophthalic anhydride, tetrachlorophthalic anhydride, 5-norbornene-2,3-dicarboxylic anhydride, 5-norbornene-2,3-dicarboxylic acid, 2,3-norbornanedicarboxylic acid, 2,3-norbornanedicarboxylic acid anhydride, and mixtures thereof.

19. The method of claim 1, wherein the acyclic aliphatic diacid (e) is selected from the group consisting of adipic acid, maleic anhydride, maleic acid, fumaric acid, itaconic anhydride, succinic acid, succinic anhydride, glutaric acid, itaconic acid, citraconic anhydride, citraconic acid, dodecanedioic acid, sebacic acid, azelaic acid, and mixtures thereof.

20. The method of claim 1, wherein (a) comprises from 30 to 40 mole % 2,2,4,4-tetramethyl-1,3-cyclobutanediol and (b) comprises from 60 to 70 mole % of a diol selected from the group consisting of 2,2-dimethyl-1,3-propanediol, 1,2-cyclohexanedimethanol, 1,3-cyclohexanedimethanol, 1,4-cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 1,4-butanediol, 1,6-hexanediol and mixtures thereof, wherein the mole % is based on the total moles of (a) and (b).

21. The method of claim 1, wherein the diacid component comprise 60 to 70 mole % of the residues of at least one alicyclic diacid comprising an anhydride and 32 to 38 mole % residues of an acyclic alphatic diacid comprising adipic acid, succinic anhydride, succinic acid, glutaric acid and mixtures thereof, and, wherein the curable polyester is obtained with no or less than 3 mole % acids having a carboxylic acid functionality of greater than 2 based on the total moles of all carboxylic acid compound residues.

* * * * *